US012764697B2

(12) United States Patent
Agarwal et al.

(10) Patent No.: US 12,764,697 B2
(45) Date of Patent: Oct. 13, 2026

(54) METHODS AND SYSTEMS FOR HANDLING NON-TERRESTRIAL NETWORK CONNECTIONS

(71) Applicant: SAMSUNG ELECTRONICS CO., LTD., Suwon-si (KR)

(72) Inventors: Aman Agarwal, Bangalore (IN); Kailash Kumar Jha, Bangalore (IN); Amit Anandrao Dange, Bangalore (IN); Gokul K, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 237 days.

(21) Appl. No.: 18/793,455

(22) Filed: Aug. 2, 2024

(65) Prior Publication Data

US 2025/0048308 A1 Feb. 6, 2025

Related U.S. Application Data

(63) Continuation of application No. PCT/KR2024/011393, filed on Aug. 2, 2024.

(30) Foreign Application Priority Data

Aug. 2, 2023 (IN) ............................. 202341052069
Jul. 23, 2024 (IN) ............................. 202341052069

(51) Int. Cl.
*H04W 60/06* (2009.01)
*H04W 4/14* (2009.01)
(Continued)

(52) U.S. Cl.
CPC ........... *H04W 60/06* (2013.01); *H04W 48/18* (2013.01); *H04W 4/14* (2013.01); *H04W 84/042* (2013.01); *H04W 84/06* (2013.01)

(58) Field of Classification Search
CPC ....... H04W 60/06; H04W 4/14; H04W 48/18; H04W 60/04; H04W 84/042;
(Continued)

(56) References Cited

U.S. PATENT DOCUMENTS 11,570,834 B2 1/2023 Niemi et al.
2022/0408393 A1 * 12/2022 Viswanath ............ H04W 60/00
(Continued)

FOREIGN PATENT DOCUMENTS

CN 116094911 A 5/2023
IN 202141010370 A 9/2022
(Continued)

OTHER PUBLICATIONS

IP.com search History (Year: 2026).*
(Continued)

*Primary Examiner* — Moustapha Diaby
(74) *Attorney, Agent, or Firm* — Sughrue Mion, PLLC

(57) ABSTRACT

A method performed by a User Equipment (UE) for handling a Non-Terrestrial Network (NTN) connection, includes: detecting at least one of: a presence of the UE in an NTN only coverage area, or a non-availability of a Terrestrial Network (TN) coverage at a location of the UE; determining an availability of an NTN; selecting the NTN for a registration of the UE; determining an absence of a voice-service support from the selected NTN, wherein the absence of the voice-service support indicates that the selected NTN does not support a voice service for the UE; performing at least one control action to avoid searching for the voice service during the registration of the UE on the NTN; and completing the registration of the UE on the NTN, based on the performed at least one control action.

17 Claims, 20 Drawing Sheets

(51) Int. Cl.
*H04W 48/18* (2009.01)
*H04W 60/04* (2009.01)
*H04W 84/06* (2009.01)
*H04W 84/04* (2009.01)

(58) Field of Classification Search
CPC . H04W 84/06; H04B 7/1851; H04B 7/18545; H04B 7/18563; H04L 65/1016; H04L 65/1073
See application file for complete search history.

(56) References Cited

U.S. PATENT DOCUMENTS

| | | | | |
|---|---|---|---|---|
| 2023/0014944 | A1* | 1/2023 | Chaponniere | H04W 36/00 |
| 2023/0079636 | A1* | 3/2023 | Edge | H04W 60/04<br>370/316 |
| 2023/0216581 | A1* | 7/2023 | Stanwood | H04B 7/18578<br>398/125 |
| 2023/0262597 | A1 | 8/2023 | Khahn et al. | |
| 2024/0236833 | A1 | 7/2024 | Satyaganapati et al. | |
| 2025/0016721 | A1* | 1/2025 | Edge | H04W 64/00 |
| 2025/0234318 | A1* | 7/2025 | Catovic | H04W 12/06 |

FOREIGN PATENT DOCUMENTS

| | | | |
|---|---|---|---|
| KR | 10 2023 0123144 | A | 8/2023 |
| RU | 2787012 | C2 | 12/2022 |
| TW | 202310664 | A | 3/2023 |
| WO | 2022/133878 | A1 | 6/2022 |
| WO | 2022/182120 | A1 | 9/2022 |
| WO | 2023/133023 | A1 | 7/2023 |

OTHER PUBLICATIONS

International Search Report (PCT/ISA/210) issued on Oct. 30, 2024 by the International Searching Authority in International Application No. PCT/KR2024/011393.
Written Opinion (PCT/ISA/237) issued on Oct. 30, 2024 by the International Searching Authority in International Application No. PCT/KR2024/011393.
Turkcell et al., "Service continuity between NTN and TN," R2-2108100, 3GPP TSG-RAN WG2 Meeting #115-e, Aug. 2021, total 7 pages.
Communication dated Mar. 5, 2026 issued by the European Patent Office in European Application No. 24849653.1.
3GPP TS 24.501 V18.2.1 (Mar. 2023), 3rd Generation Partnership Project; Technical Specification Group Core Network and Terminals; Non-Access-Stratum (NAS) protocol for 5G System (5GS); Stage 3 (Release 18), 1054 pages.
3GPP TS 24.301 V18.2.1 (Mar. 2023), 3rd Generation Partnership Project; Technical Specification Group Core Network and Terminals; Non-Access-Stratum (NAS) protocol for Evolved Packet System (EPS); Stage 3 (Release 18), 622 pages.
Communication dated Jun. 5, 2026, issued by Intellectual Property India in Indian Application No. 202341052069.
Communication issued on Jul. 24, 2026 by the Russian Patent Office in Russian Patent Application No. 2025137500.

* cited by examiner

METHODS AND SYSTEMS FOR HANDLING NON-TERRESTRIAL NETWORK CONNECTIONS

CROSS-REFERENCE TO RELATED APPLICATIONS

This application is a by-pass continuation application of International Application No. PCT/KR2024/011393, filed on Aug. 2, 2024, which is based on and claims priority to Indian Patent Application number 202341052069, filed on Aug. 2, 2023, and Indian Patent Application number 202341052069, filed on Jul. 23, 2024, in the Indian Intellectual Property Office, the disclosures of which are incorporated by reference herein their entireties.

BACKGROUND

1. Field

The disclosure relates to telecommunication networks, and more particularly, relates to methods and systems for handling a non-terrestrial network (NTN) connection by a user equipment (UE).

2. Description of Related Art

With the advancements in telecommunications, the demand for faster data transmission, lower latency, and improved connectivity has led to expanding the coverage of 5G network access. non-terrestrial network (NTN) deployments are being planned with different architectures and designs.

The 3GPP Release-16 TR 38.821 defines NTN platforms in terms of satellites in different orbits (such as low earth orbit (LEO), medium earth orbit (MEO), and geostationary earth orbit (GEO)), and unmanned aircraft system (UAS) which includes high altitude platform systems (HAPS). The GEO and UAS may be used to provide continental, regional, or local coverage with the radio beams typically remaining fixed with respect to the mobile device. The LEO and the MEO platforms may be used to provide services in both the northern and southern hemispheres. However, the satellites and their associated radio beams will move as they orbit the Earth.

With higher altitudes, the beam footprint is greater, and thus, the achievable coverage is also greater. However, an increase in altitude also causes an increase in delay or latency which, depending upon the application utilizing the network, may bring numerous issues.

At least due to the above-mentioned reasons as well as the cost and efforts involved in the deployment, the initial stages of NTN technology being deployed by the operators are supporting only limited services (such as SMS only) and the UEs connected to NTN technology gets only those limited services. Moreover, the network operators, in some cases, are deploying NTN services using existing 3GPP Technologies (for example, using 3GPP radio access technologies (RATs) such as LTE, i.e. deploying LTE-based Satellite system) to ease the deployment.

Therefore, NTN services are currently being deployed in areas where terrestrial network (TN) services are not available or are very limited. The major use case behind deploying a NTN is to provide network access to the users when TN coverage is not possible. Hence, most of the NTN deployments are taking place in remote areas (with no TN coverage or very limited TN coverage with certain coverage holes) during the initial stage.

Moreover, due to the high altitude/high orbital velocity of NTN satellites, deploying all the services over the NTN network comes with its own set of challenges and costs. Therefore, the services (that operators are choosing to deploy over the NTN networks) are limited to a set of few specific services (such as SMS only or small data packets), which require fewer resources and may be served well by the NTN satellite network.

The satellite NTN networks are capable of handling small data or SMS services as they are relatively less challenging than real-time services like voice calling. Hence, most of the NTN deployments by the operators may provide only services like SMS (normal or emergency) or small data-based communication, and the like. Voice service over NTN may not be supported or may be limited to only a set of specific or priority users.

In such scenarios, when most UEs are voice-centric devices (which means giving priority to voice services over data services, for example, with UE usage setting as voice centric), these UEs will not be able to register immediately to NTN networks that do not support voice services and will look for alternate networks, even though there may not be any alternate networks available in those areas leading to delay in getting services from NTN.

As per 3GPP standards, voice-centric devices (like smartphones, watches, and the like) need to prefer, search, select and register on the network providing voice services. However, often, terrestrial network coverage will not be available to the voice centric UE when NTN is available, and initiating a search procedure for voice service in terrestrial or any network during such a scenario is not successful (for example, the UE may not find a suitable or allowable network in TN for normal services or voice services). This leads to unnecessary delays in camping to the NTN network, increases power consumption due to searching for alternate networks, and negatively affects the experience of the users.

The UE usage setting defined in 3GPP TS 24.301 (for 5G) or 3GPP TS 24.301 (for LTE/4G) applies to voice-capable UEs in 5G system (5GS) or evolved packet system (EPS) (for example, LTE or 4G) and indicates whether the UE has a preference for voice services over data services or vice-versa, where: a) voice services include IP multimedia system (IMS) voice, and b) data services include any kind of user data transfer without a voice media component. The UE's usage setting may be set to a) "voice-centric"; or b) "data-centric". If the UE is capable of S1 mode, there is a single UE's usage setting at the UE which applies to both 5GS and EPS.

Further, the types of usage settings for the UE in 3GPP TS 24.501 (for 5G) or 3GPP TS 24.301 (for LTE/4G) are broadly categorized into two types, i.e. voice-centric devices and data-centric devices. The voice-centric devices are those devices that prioritize voice services over any other services or RATs. Most of the end-user's smartphone devices are voice-centric, since voice calling services are essential for these devices from an end-user perspective. Also, data-centric devices are devices that prioritize data services and data services providing RATs over other services such as voice services. Usually, data-centric devices do not support voice services and operate primarily on data services. For instance, data-centric devices may include devices such as tablets, Internet of Things (IoT) devices, and the like.

IMS voice service availability evaluation by UE is defined in 3GPP TS 24.501, Section 4.3, in that, "the UE supports IMS voice over 3GPP access" evaluates to "true" if at least one of the following is fulfilled: 1) the UE supports IMS voice over new radio (NR) connected to 5G core network (5GCN); 2) the UE supports IMS voice over evolved universal terrestrial radio access (E-UTRA) connected to 5GCN; or 3) the UE supports IMS voice in evolved packet system (EPS).

Further, "IMS voice not available" refers to one of the following conditions: a) the UE does not support IMS voice; b) the UE supports IMS voice, but the network indicates in the REGISTRATION ACCEPT message that IMS voice over PS sessions is not supported; or c) the UE supports IMS voice, the network indicates in the REGISTRATION ACCEPT message that IMS voice over PS sessions is supported, but the upper layers provide no indication that the UE is available for voice call in the IMS within a manufacturer-determined period of time, or the upper layers indicate that the UE is not available for voice calls in the IMS.

In this regard, if conditions 'a' and 'b' are evaluated to be false, the upper layers need time to attempt IMS registration. In the event, that an indication from the upper layers that the UE is available for voice calls in the IMS takes longer than the manufacturer-determined period of time (e.g., due to delay when attempting IMS registration or due to delay in obtaining a quality of service (QOS) flow for session initiation protocol (SIP) signaling), the non access stratum (NAS) layer assumes that the UE is not available for voice calls in the IMS. Other conditions may exist but are implementation specific.

For a UE to evaluate IMS voice service availability, certain checkpoints have been specified in 3GPP TS 24.501 Sec 4.3 (for NR/5G), and similar checkpoints are defined in 3GPP TS 24.301 Sec 4.3 (for LTE/4G). Devices, in general, are capable of supporting IMS voice services over 5G/4G.

However, usually in the case of NTN deployment, even when a UE supports IMS voice, but due to network deployment, "IMS voice service not available" may be evaluated as "true". For example, UE may support IMS voice however, the current camped NTN may not support IMS voice services, i.e., "IMS voice over PS sessions are not supported" may be indicated by the Network in REGISTRATION ACCEPT or any access stratum (AS) or NAS signaling message (like ATTACH ACCEPT or TAU ACCEPT). Thus, IMS voice may be declared as not available.

Further, a change of IMS voice service procedure is defined in Section 4.3 of 3GPP TS 24.501. Table 1 (corresponds to Table 4.3.4.1 in the above-noted section) below refers to the change of IMS voice availability for a UE in single-registration mode.

TABLE 1

| Change of IMS voice available condition | Procedure to execute |
|---|---|
| "IMS voice not available" over 3GPP access only and the UE's usage setting is "voice-centric". | Disable the N1 mode capability for 3GPP access, if the UE is only registered over 3GPP access (see sub-clause 4.9.2). (NOTE 2) |

Further, the sub-clause 4.9.2 of 3GPP TS 24.501 refers to disabling and re-enabling UE's N1 mode capability for 3GPP access. When the UE is disabling the N1 mode capability for 3GPP access for a public land mobile network (PLMN) not due to redirection to EPC, the UE should proceed as follows:

(1) select an E-UTRA cell connected to the EPC of the registered PLMN or a PLMN from the list of equivalent PLMNs, if the UE supports S1 mode and the UE has not disabled its E-UTRA capability as specified in 3GPP TS 24.301;

(2) if an E-UTRA cell connected to EPC of the registered PLMN or a PLMN from the list of equivalent PLMNs cannot be found, the UE does not support S1 mode or the UE has disabled its E-UTRA capability as specified in 3GPP TS 24.301, the UE may select another RAT of the registered PLMN or a PLMN from the list of equivalent PLMNs that the UE supports;

(3) if another RAT of the registered PLMN or a PLMN from the list of equivalent PLMNs cannot be found, enter the state 5GMM-REGISTERED.PLMN-SEARCH or 5GMM-DEREGISTERED.PLMN-SEARCH or the UE does not have a registered PLMN, enter the state 5GMM-DEREGISTERED.PLMN-SEARCH and perform PLMN selection as specified in 3GPP TS 23.122. If disabling the N1 mode capability for 3GPP access is not due to a UE-initiated de-registration procedure for 5GS services over 3GPP access not due to switch-off, the UE may re-enable the N1 capability for this PLMN selection. As an implementation option, if the UE does not have a registered PLMN, instead of performing PLMN selection, the UE may select another RAT of the selected PLMN if the UE has chosen a PLMN and the RAT is supported by the UE; or (4) if no other allowed PLMN and RAT combinations are available, the UE may re-enable the N1 mode capability for 3GPP access and indicate to lower layers to remain camped in NG-RAN of the registered PLMN and may periodically scan for another PLMN and RAT combination which may provide EPS services or non-EPS services (if the UE supports EPS services or non-EPS services). The methodology of performing periodic scanning is UE implementation dependent.

If the UE operates in single-registration mode (registered to only NG-RAN), whenever the IMS voice availability is determined or changes, the UE shall execute procedures according to table 4.3.4.1 in 3GPP TS 24.501 (for NR/5G) or similar specification defined in section 4.3.2.4 and 4.5 in 3GPP TS 24.301 (for LTE/4G).

As per the standard specification, for voice-centric devices, if IMS voice availability is evaluated as "not available", these devices must disable N1 or S1 mode capabilities and follow the procedure defined in sub-clause 4.9.2 in 3GPP TS 24.501 or similar sub-clause 4.5 in 3GPP TS 24.301. According to this sub-clause, the UE searches for voice services in the registered PLMN/other selected PLMNs in different supported RATs.

A large number of operators are deploying NTN to provide services to users where normal services could not be provided using terrestrial networks. Moreover, NTN services are searched when the terrestrial network search is over, and the terrestrial network cannot be found (i.e. NTN PLMN search/selection is de-prioritized and TN services are preferred before actually searching/selecting NTN services). There may be terrestrial network(s) available in the area, but the TN may not be suitable or allowable for the UE for getting normal services (for example, UE may not be able to get normal services (for example, full set of services such as Voice, Data, SMS and the like) from the terrestrial network. The terrestrial network may be a part of a forbidden list present in the UE). The UE may assume that the UE is in a location where TN coverage is not available and only NTN coverage may be available in the location which may provide normal service to the UE (for example, normal service with only SMS or data etc.). However, the NTN services are very limited and may be restricted to certain services only (such as SMS services only—either just emergency SMS only or both emergency as well as normal SMS). Multimedia messaging service (MMS) data and voice services may not be provided by the network via NTN services or may only be provided to certain segments of users (like priority users).

Due to this, a large number of users are only able to get SMS services during the initial stages of NTN deployment. The network indicates to the device (UE) in any of the AS or NAS signaling messages (like ATTACH ACCEPT/ATTACH REJECT, REGISTRATION ACCEPT/REGISTRATION REJECT, TRACKING AREA UPDATE (TAU) ACCEPT/TAU REJECT, and the like) that “IMS voice over PS sessions are not supported”. The network may also indicate “SMS only” services in the additional update result information element (IE) or indicate in any bit/IE that IMS voice is not available and may indicate that voice services are not available and only SMS service is available on the current Network. The network may further reject via some 5GMM or EMM cause code (for example, Cause Code #18 and the like) or indicate that CS Domain is not available (if UE is attempting combined ATTACH).

Further, the UE gets to know that the network only supports SMS services and does not support voice services over IMS while UE is camped to NTN networks.

However, the majority of the UE(s) currently require voice services and the UE usage setting will be set to “Voice Centric” with UE operating in either single or dual registration mode.

Currently, as per 3GPP TS 24.301 and 24.501, if a voice-centric UE tries registering to the network and does not get IMS voice services:

The UE disables N1 mode (NG-RAN capability) or disable S1 mode (or EUTRAN capability) or both capabilities.

Also, the UE will try selecting another RAT (GSM EDGE radio access network (GERAN) or universal terrestrial radio access network (UTRAN) or evolved-UMTS terrestrial radio access network (EUTRAN) or next-generation radio access network (NG-RAN)) for the registered/selected PLMN/other PLMNs from equivalent PLMN List.

If no network is found, the device performs PLMN selection. If no other allowed PLMN and RAT combinations are available, the device may re-enable EUTRAN/NG-RAN capability and remain registered for evolved packet system (EPS) or 5GS services. The UE may periodically attempt to select another PLMN and RAT combination that may provide voice services.

The above configuration in the existing techniques leads to unnecessary delays in getting the available services (like SMS services) from NTN RATs. The delay is encountered as the device unnecessarily searches for all the RATs and PLMNs again to see if voice services are available (which are not available as NTN RAT is selected already as a last option) and later, comes back to the same NTN RAT/PLMN after a delay of searching all the other RATs/PLMNs.

The device may additionally start any temporary back-off timer (for ex-PLMN back-off timer) or any 3GPP timer (such as T3402) or any network given/UE implementation dependent timer for the selected NTN PLMN-RAT combination, optionally while disabling N1 or S1 mode, leading to delay in the acquisition of available NTN services. The device may add the selected or the registered Network (for example, PLMN or RAT or Cell or any combination of these to any temporary back-off Network List or forbidden Network List or any back-off list) which may lead to delay in the acquisition of available NTN services.

In the existing techniques, the network operators deploy NTN services in the areas where no other TNs are found, or TN services cannot be provided. There may be terrestrial network(s) available in those area, but the TN may not be suitable or allowable for the UE (for example, the terrestrial network may not have any partnership with the network operator or home PLMN (HPLMN) of the UE and may not provide normal services to the UE. The NTN may be deployed by the HPLMN or any of the partner network of the network operator/HPLMN of the UE. In the existing techniques, the UE searching for another network (RAT/PLMN) for voice services unnecessarily delays the camping for NTN services. Moreover, the device may camp to the same NTN network that it camped/registered earlier for EPS/5GS services, but with a delay. Further, the NTN will still not provide any voice services (i.e., with available services only like SMS only).

Moreover, network operators are currently deploying or partnering with satellite service providers to get limited NTN services (for example, SMS services only). In the existing techniques, the unnecessary disabling of the S1/N1 mode (NG-RAN or EUTRAN mode) or searching for other RAT/PLMN, due to no voice service availability on the NTN RAT, causes a huge delay in receiving NTN services. Moreover, the UEs may be currently configured to search for the registered PLMN for all the RAT(s). Further, the NTN PLMN might be an NTN-specific PLMN and may be available in just the NTN RAT and not available in any other RAT(s). The mentioned issues in the existing techniques result in additional device power consumption due to unnecessary scanning of the NTN PLMN(s) in all the RAT(s). Further, additional device power consumption is attributed to additional PLMN/RAT search/selection, in the event voice services are not available in the NTN PLMN. The present behavior of a voice-centric user device in such scenarios does not provide a good user experience and needs to be improved.

FIG. 1 illustrates delayed camping to NTN services during non-availability of IMS voice, in accordance with the prior art. As illustrated in first scenario 11 in FIG. 1, voice-centric UE is in the NTN-only coverage area and UE attempts registration or attach or TAU procedure for the NTN cell or RAT or PLMN. During registration/attach/TAU procedure, the NTN network indicates to the UE that IMS voice services are not supported by the NTN cell and/or only SMS services are available (for example, voice services are not available).

Further as illustrated in a second scenario 13 of FIG. 1, the UE is configured in the existing techniques to disable N1/S1 mode capabilities and triggers cell search for the registered/other PLMN on same or other RATs for voice service. During the search for the registered/other PLMNs in same/different RATs, UE will be in a No-Service state. Since the UE is in an NTN only coverage area, cell/PLMN/RAT/Access search for voice service in same or different cell/PLMN/RAT/Access eventually fails.

Further, as illustrated in a third scenario 15 of FIG. 1, the UE re-enables N1/S1 mode capabilities and camps on to any available cell for the registered/available/selected PLMN. Since only NTN cell(s)/PLMN(s)/RAT(s)/Access(es) are available for the registered/selected/available PLMN(s), UE camps back to the NTN cell/PLMN/RAT/Access with a delay associated with unnecessarily searching for cells in other RATs/PLMNs/Accesses.

FIG. 2 illustrates a signaling flow diagram for delayed camping to NTN services during non-availability of IMS voice or any voice services, in accordance with the prior art. As shown in the FIG. 2, the UE is in a remote location and only PLMN1 NTN cell is available. There may be no TN coverage (for example, suitable or allowable TN coverage) available.

At 20-1, a registration request or an Attach Request or a TAU request is sent from the UE to PLMN1 or the NTN.

At 20-2, registration/Attach/TAU accept (or via any AS or NAS signaling message or any IE) with absence of support for IMS voice (for example, Network may indicate IMS voice or any voice service is not available. In an embodiment, the Network may indicate SMS only services and that only SMS services are supported, and voice services are not supported) is indicated to the UE.

At 20-3, the UE disables N1 mode (or similarly S1 mode or any RAT mode) capabilities, optionally for the selected Network.

At 20-4, the UE triggers a cell/PLMN/RAT/Access/Network search for voice services in registered/selected/available or any other PLMNs and PLMNs of other RATs.

At 20-5, the UE will search for cell/PLMN/RAT/Access/Network supporting voice services and will be out of service (OOS) or in No Service for the search duration.

At 20-6, in the absence of any other RATs/PLMN/Cell/Access/Network with voice service support, the UE re-enables N1 mode (or similarly S1 mode or any RAT mode) capabilities and attempts registration/Attach/TAU on available PLMN1 or the NTN.

At 20-7, the UE resends the registration/Attach/TAU request.

At 20-8, the UE again receives registration/Attach/TAU accept. Further, an indication associated with absence of support for IMS voice is indicated to the UE (for example, Network may indicate IMS voice or any voice service is not available. In an embodiment, the Network may indicate SMS only services and that only SMS services are supported, and voice services are not supported).

At 20-9, the UE remains camped or registered to the PLMN1 or the NTN.

Thus, FIG. 2 illustrates a scenario where there is no TN coverage available for the UE. IMS voice is not supported in the NTN cell and the network indicates SMS-only registration to the UE. As the UE is voice-centric, the UE disables N1 mode capabilities as per 3GPP specification and searches for voice-supported cells in other cells/RATs. When no other cells/RATs are available, the UE re-enables N1 mode capabilities and camps back to the same gNB1 NTN cell as the only available cell.

FIG. 3 illustrates delayed camping to NTN services during non-availability of IMS voice (or any voice services) (or availability of SMS only services), in accordance with the prior art. At 30-1, the voice-centric UE moves from TN coverage to the NTN-only coverage area. At 30-2, as there are no TN cells/PLMNs/RATs/Access available, the UE finds available NTN cells/PLMNs/RATs and attempts registration/Attach/TAU to the NTN cell/PLMN/RAT. At 30-3, during the registration/Attach/TAU process, the NTN cell/PLMN or Network indicates to the UE that IMS voice service is not available (for example, Network may indicate IMS voice or any voice service is not available. In an embodiment, the Network may indicate SMS only services and that only SMS services are supported, and voice services are not supported). At 30-4, the UE disables N1 (or similarly S1 mode or any RAT mode) capability and triggers cell/PLMN/RAT/Network search as per 3GPP TS 2.4.501 section 4.9.2. At 30-5, after a cell/PLMN/RAT/Network search on all possible RATs, no suitable cell/PLMN/RAT/Network is found. At 30-6, the UE camps back to the same NTN cell/PLMN/RAT/Network with SMS-only service and without any voice services. As shown in FIG. 3, when UE camps to NTN, it implies that there is no TN available in the area. However, in the existing techniques, in the event the NTN cell notified SMS-only service and no IMS voice service indication, the UE unnecessarily searches for other PLMNs/RATs/Cells for TN/NTN cells/PLMN/RAT/Network. When no other suitable cell/PLMN/RAT/Network is found, the UE camps back to the same NTN cell/PLMN/RAT/Network with a delay. The delay in camping is associated with the wastage of time and battery power of the UE in searching for alternate PLMNs or RATs.

Accordingly, there is a need for a solution to overcome the above-mentioned problems to provide faster and more stable NTN services to a voice-centric device when the available NTN network does not support voice services.

SUMMARY

This summary is provided to introduce a selection of concepts, in a simplified format, that are further described in the detailed description of the disclosure. This summary is neither intended to identify key or essential inventive concepts of the disclosure nor is it intended for determining the scope of the disclosure.

According to an aspect of the disclosure, a method performed by a user equipment (UE) for handling a non-terrestrial network (NTN) connection, includes: detecting at least one of: a presence of the UE in an NTN only coverage area, or a non-availability of a terrestrial network (TN) coverage at a location of the UE; determining an availability of an NTN; selecting the NTN for a registration of the UE; determining an absence of a voice-service support from the selected NTN, wherein the absence of the voice-service support indicates that the selected NTN does not support a voice service for the UE; performing at least one control action to avoid searching for the voice service during the registration of the UE on the NTN; and completing the registration of the UE on the NTN, based on the performed at least one control action.

According to an aspect of the disclosure, a UE configured to handle a NTN connection, includes: at least one memory; at least one communicator; and at least one processor, operably connected to the at least one memory and the at least one communicator, the at least one processor being configured to: detect at least one of a presence of the UE in an NTN only coverage area or a non-availability of a TN coverage at the location of the UE; determine an availability of an NTN; select the NTN for a registration of the UE; determine an absence of a voice-service support from the selected NTN, wherein the absence of the voice-service support indicates that the selected NTN does not support a voice service for the UE; perform at least one control action to avoid searching for the voice service during the registration of the UE on the NTN; and complete the registration on the NTN based on the performed at least one control action.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein.

Figure 1:
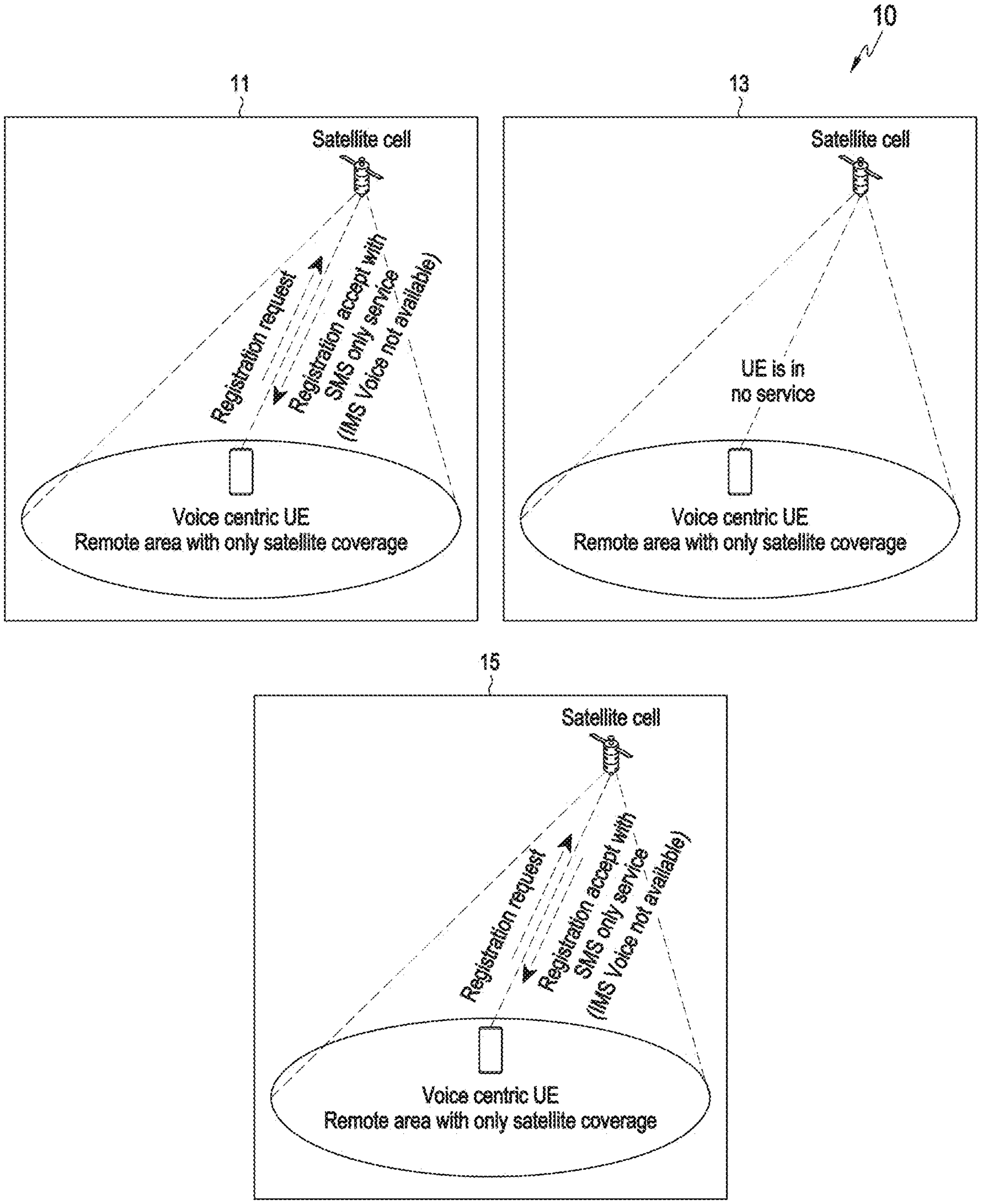
FIG. 1 (PRIOR ART)
FIG. 1 illustrates delayed camping to NTN services during non-availability of IMS voice, in accordance with the prior art.
Figure 2:
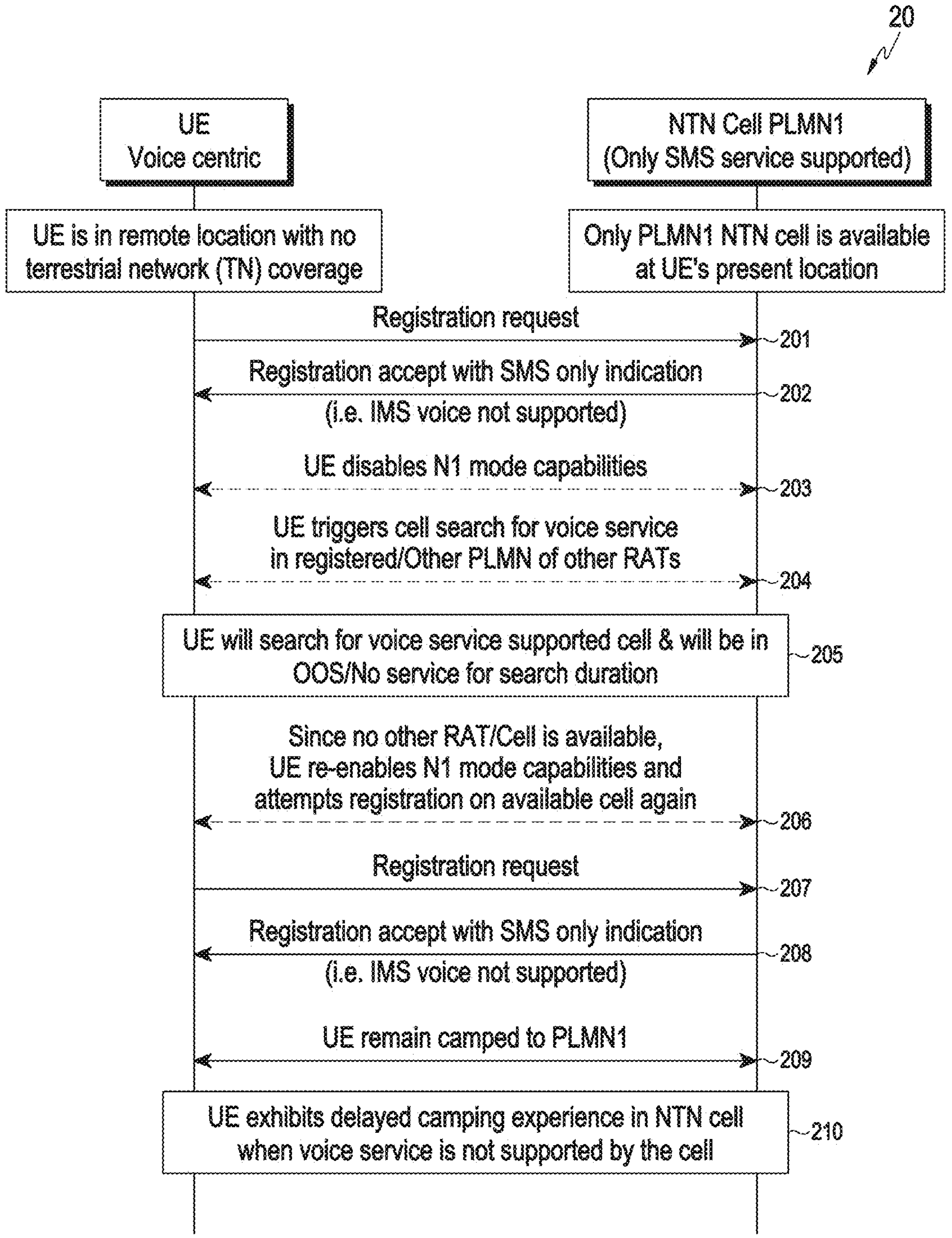
FIG. 2 (PRIOR ART)
FIG. 2 illustrates a signaling flow diagram for delayed camping to NTN services during non-availability of IMS voice, in accordance with the prior art.
Figure 3:
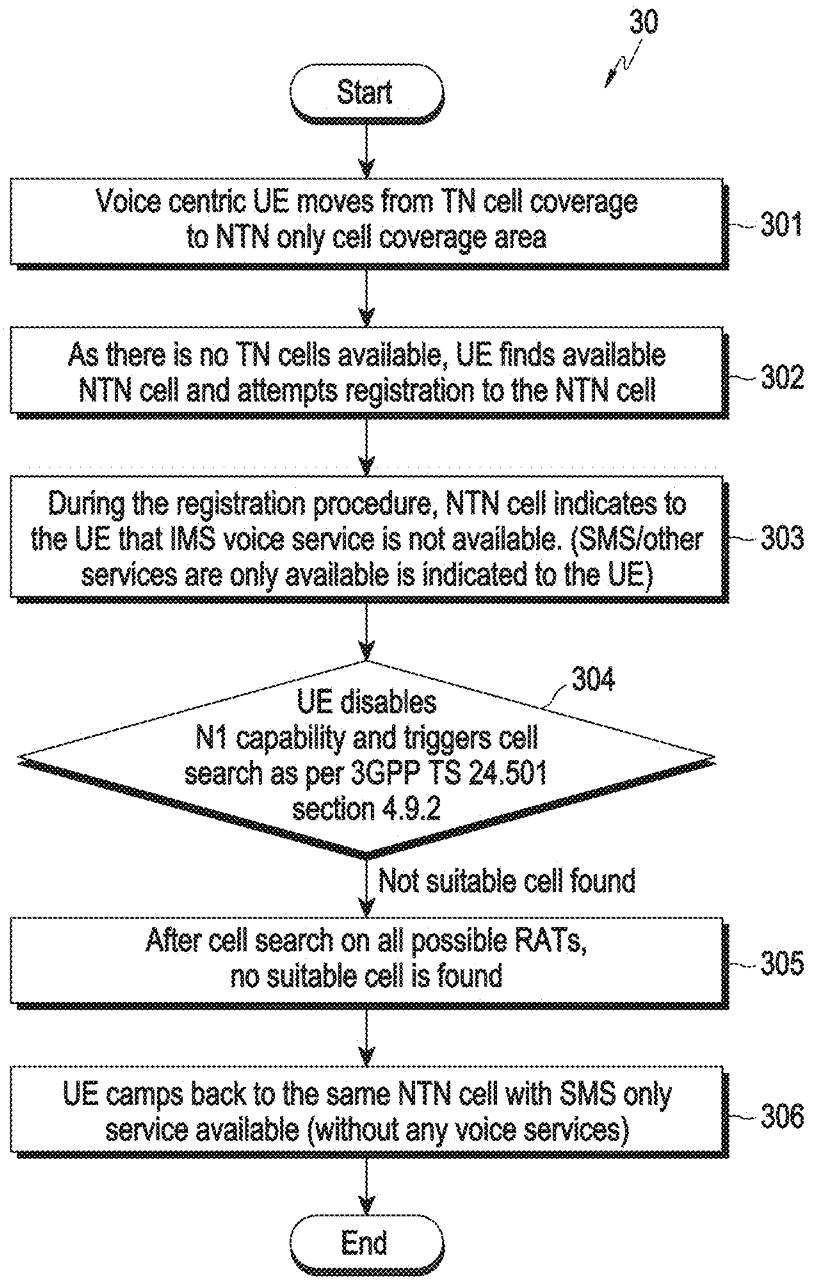
FIG. 3 illustrates delayed camping to NTN services during non-availability of IMS Voice, in accordance with the prior art.

Further, skilled artisans will appreciate that elements in the drawings are illustrated for simplicity and may not have necessarily been drawn to scale. For example, the flow charts illustrate the method in terms of the most prominent operations involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as normally occurs to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprise", "comprising", or any other variations thereof, are intended to cover a non-exclusive inclusion, such that a process or method that comprises a list of steps/operations does not include only those steps/operations but may include other steps/operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

Before undertaking the detailed description below, it may be advantageous to set forth definitions of certain words and phrases used throughout the disclosure. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

Moreover, multiple functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The disclosure is directed to a method and system for providing stabilized NTN services to a voice-centric UE in a region with the absence of voice services.

The following abbreviations and definitions have been referred to herein:

3GPP: Third Generation Partnership Project
5GC: 5G Core
5GCN: 5G Core Network
5G-GUTI: 5G-Globally Unique Temporary Identifier
5GMM: 5G Mobility Management
5GS: 5G System
5GSM: 5GS Session Management
5G-S-TMSI: 5G S-Temporary Mobile Subscription Identifier
5G-TMSI: 5G Temporary Mobile Subscription Identifier
AMF: Access and Mobility Management Function
AS: Access Stratum
CAG: Closed access group
CAG ID: Closed Access Group Identifier
CU: Centralized Unit
DC: Discontinuous Coverage
DisCo: Discontinuous Coverage
DL: Downlink
DRX: Discontinuous Reception
DU: Distributed Unit
eDRX: Extended Discontinuous Reception
EHPLMN: Equivalent Home Public Land Mobile Network
EMM: EUTRA Mobility Management
eNB: Evolved Node-B
eNPN: Enhanced Non-Public Networks
EPC: Evolved Packet Core
EPLMN: Equivalent Public Land Mobile Network
EPS: Evolved Packet System
eSIM: Embedded Subscriber Identity Module
E-UTRA: Evolved Universal Mobile Telecommunication Access
EUTRAN: Evolved Universal Mobile Telecommunication Access Network
FPLMN: Forbidden Public Land Mobile Network
FR: Frequency Range
GEO: Geostationary Orbit
GERAN: GSM Edge Radio Access Network GERAN EC-GSM-IoT: GSM Edge Radio Access Network Extended Coverage-GSM-Internet of Things
gNB: Next generation Node-B
gNB-CU: Next generation Node-B Control Unit
gNB-DU: Next generation Node-B Distributive Unit
GPRS: General Packet Radio Service
GSM: Global System for Mobile Communication
HPLMN: Home Public Land Mobile Network
IAB: Integrated access and backhaul
IAB-UE: The part of the IAB node that supports the Uu interface towards the IAB-donor or another parent IAB-node (and thus manages the backhaul connectivity with either PLMN or SNPN it is registered with) is referred to as an IAB-UE.
LADN: Local Area Data Network
LEO: Low Earth Orbit
MCC: Mobile Country Code
ME: Mobile Equipment
MEC: Multi-Access Edge Computing
MEO: Medium Earth Orbit
MICO: Mobile Initiated Communication Only
MME: Mobility Management Entity
MNC: Mobile Network Code
MPS: Multimedia Priority Service
MS: Mobile Station. The present document makes no distinction between MS and UE.
NAS: Non-Access Stratum
NB-S1 Mode: Narrow Band with S1 Interface
NGAP: Next Generation Application Protocol
NG-RAN: Next Generation Radio Access Network
NPN: Non-Public Networks
NR: New Radio
NTN: Non-Terrestrial Networks
NW: Network
OOS: Out of Service
OS Upgrade: Operating System Upgrade
PDN: Packet Data Network
PDU: Packet Data Unit
PLMN ID: Public Land Mobile Network Identity
PSM: Power Saving Mode
QOS: Quality of Service
RAT: Radio Access Technology
RPLMN: Registered Public Land Mobile Network
RRC: Radio Resource Control
RU: Registration Update
SAT: Satellite
Satellite: an artificial body placed in orbit round the earth or moon or another planet in order to collect information or for communication.
Satellite Constellation: Group of satellites, placed in orbit round the earth or moon or another planet in order to collect information or for communication.
Service User: An individual who has received a priority level assignment from a regional/national authority (i.e., an agency authorized to issue priority assignments) and has a subscription to a mobile network operator.
SIM: Subscriber Identity Module
SNPN: Standalone Non-Public Networks
SUCI: Subscription Concealed Identifier
SW: Software
TAC: Tracking Area Code
TAI: Tracking Area Identity
TAU: Tracking Area Update
TER: Terrestrial
TN: Terrestrial Networks
UCU: UE Configuration Update
UDM: Unified Data Management Function
UE: User Equipment
UL: Uplink
ULI: User Location Information
UPU: UE Parameters Update
USIM: Universal Subscriber Identification Module
Uu: The radio interface between the UE and the Node B
VMR: Vehicle Mounted Relay
VPLMN: Visited Public Land Mobile Network
WB-S1 Mode: Wide Band with S1 Interface Visited PLMN (VPLMN): This is a PLMN different from the HPLMN (if the EHPLMN list is not present or is empty) or different from an EHPLMN (if the EHPLMN list is present).

Allowable PLMN: In the case of an MS operating in MS operation mode A or B, this is a PLMN which is not in the list of "forbidden PLMNs" in the MS. In the case of an MS operating in MS operation mode C or an MS not supporting A/Gb mode and not supporting Iu mode, this is a PLMN which is not in the list of "forbidden PLMNs" and not in the list of "forbidden PLMNs for GPRS service" in the MS.

Available PLMN: PLMN(s) in the given area which is/are broadcasting capability to provide wireless communication services to the UE.

Camped on a cell: The MS (ME if there is no SIM) has completed the cell selection/reselection process and has chosen a cell from which it plans to receive all available services. Note that the services may be limited, and that the PLMN or the SNPN may not be aware of the existence of the MS (ME) within the chosen cell.

EHPLMN: Any of the PLMN entries contained in the Equivalent HPLMN list.

Equivalent HPLMN list: To allow provision for multiple HPLMN codes, PLMN codes that are present within this list shall replace the HPLMN code derived from the IMSI for PLMN selection purposes. This list is stored on the USIM and is known as the EHPLMN list. The EHPLMN list may also contain the HPLMN code derived from the IMSI. If the HPLMN code derived from the IMSI is not present in the EHPLMN list, it shall be treated as a Visited PLMN for PLMN selection purposes.

Home PLMN: This is a PLMN where the MCC and MNC of the PLMN identity match the MCC and MNC of the IMSI.

Registered PLMN (RPLMN): This is the PLMN on which certain LR (location registration which is also called as registration procedure) outcomes have occurred. In a shared network the RPLMN is the PLMN defined by the PLMN identity of the CN operator that has accepted the LR.

Registration: This is the process of camping on a cell of the PLMN or the SNPN and doing any necessary LRs.

UPLMN: PLMN/access technology combination in the "User Controlled PLMN Selector with Access Technology" data file in the SIM (in priority order).

OPLMN: PLMN/access technology combination in the "Operator Controlled PLMN Selector with Access Technology" data file in the SIM (in priority order) or stored in the ME (in priority order).

Acceptable Cell/Network: Acceptable cell/Network is the cell/Network that is not enough to be a suitable cell/Network but meets the minimum condition at least to make an emergency call. The minimum conditions are: The cell/Network is not barred. The cell/Network selection criteria are met.

Suitable Cell/Network: The cell that the UE may camp on for a normal service. The E-UTRA and UTRA Suitable Cell criteria is defined in 36.304 4.3 Service types in Idle Mode as follows.

The cell is part of either: the selected PLMN (PLMN that has been selected by the NAS, either manually or automatically), or the registered PLMN (PLMN on which certain Location Registration outcomes have occurred, or a PLMN of the Equivalent PLMN list.

Further, according to the latest information provided by NAS: The cell is not barred. The cell is part of at least one TA that is not part of the list of "forbidden tracking areas for roaming." The cell selection criteria are fulfilled.

'NAS messages' as referred to herein may be (but not limited to) REGISTRATION REQUEST message; DEREGISTRATION REQUEST message; SERVICE REQUEST message; CONTROL PLANE SERVICE REQUEST; IDENTITY REQUEST; AUTHENTICATION REQUEST; AUTHENTICATION RESULT; AUTHENTICATION REJECT; REGISTRATION REJECT; REGISTRATION ACCEPT; DEREGISTRATION ACCEPT; SERVICE REJECT; SERVICE ACCEPT; UE CONFIGURATION UPDATE command, UE PARAMETERS UPDATE command, and so on.

The term 'RAT' as defined herein may be one of the following: NG-RAN, 5G, 4G, 3G, 2G, EPS, 5GS, NR, NR in unlicensed bands, NR (LEO) satellite access, NR (MEO) satellite access, NR (GEO) satellite access, NR (OTHERSAT) satellite access, NR reduced capacity (RedCap), E-UTRA, E-UTRA in unlicensed bands NB-IoT, WB-IoT, LTE-M, and so on.

Registration or 5GS registration may refer to any 5GS Registration type which may be initial registration, mobility registration, updating periodic registration, updating emergency registration, SNPN onboarding registration, disaster roaming initial registration/disaster roaming mobility registration updating, and so on.

PLMN selection as per 3GPP TS 23.122 without RPLMN: The MS selects and attempts registration on any PLMN/access technology combinations, if available and allowable, in the following order: either the HPLMN (if the EHPLMN list is not present or is empty) or the highest priority EHPLMN that is available (if the EHPLMN list is present); each PLMN/access technology combination in the "User Controlled PLMN Selector with Access Technology" data file in the SIM (in priority order); each PLMN/access technology combination in the "Operator Controlled PLMN Selector with Access Technology" data file in the SIM (in priority order) or stored in the ME (in priority order); other PLMN/access technology combinations with received high quality signal in random order; and other PLMN/access technology combinations in order of decreasing signal quality.

PLMN selection as per 3GPP TS 23.122 with RPLMN: The MS selects and attempts registration on any PLMN/access technology combinations, if available and allowable, in the following order: either the RPLMN or the Last registered PLMN; either the HPLMN (if the EHPLMN list is not present or is empty) or the highest priority EHPLMN that is available (if the EHPLMN list is present); each PLMN/access technology combination in the "User Controlled PLMN Selector with Access Technology" data file in the SIM (in priority order); each PLMN/access technology combination in the "Operator Controlled PLMN Selector with Access Technology" data file in the SIM (in priority order) or stored in the ME (in priority order); other PLMN/access technology combinations with received high quality signal in random order; and other PLMN/access technology combinations in order of decreasing signal quality.

The terms UE and MS may be used interchangeably in the disclosure and have the same meaning. The term area/location/geographical area are used in this disclosure may refer to any of cell/cell ID, TAC/TAI, PLMN, MCC/MNC, Latitude/longitude, CAG cell or any geographical location/coordinate. The solutions explained in this disclosure are applicable to any (but not limited to) of the RAT(s) as defined in this disclosure.

The Network or Network Functions used in this disclosure could be any 5G/EUTRAN Core Network Entities like AMF/SMF/MME/UPF/PCF/AF/OAM/NEF/UDM/HSS or the Network could be any (but not limited to) 5G/EUTRAN RAN Entity like eNodeB (eNB) or gNodeB (gNB) or NG-RAN, and the like.

The NTN and TN could either operate in two different frequency bands (e.g. FR1 vs FR2), or in same frequency band (e.g. FR1 or FR2).

The terms NTN, 3GPP based Satellite Network, Satellite 3GPP access, Satellite access, Satellite Access Network, NR Satellite Access Network, Satellite NG-RAN Access Technology and NR Satellite access have been interchangeably used and have the same meaning.

The methods, issues or solutions disclosed in this disclosure are explained using NR satellite access or Satellite NG-RAN Access Technology as an example and is not restricted or limited to NR Satellite access only. However, the solutions proposed in this disclosure are also applicable for any NTN Technology, any 3GPP based Satellite Network, any legacy 3GPP Networks (for example, NR, LTE), Satellite E-UTRAN access Technology, NB (narrow band)-S1 mode or WB (wide band)-S1 mode via satellite E-UTRAN access and/or NB-IoT (narrow band internet of things) or WB-IoT (wide band internet of things) satellite access/architecture.

The solutions and procedures which are defined for NR (5GC) are also applicable to legacy RATs like E-UTRA/LTE, the corresponding 5G CN entities needs to be replaced by LTE entities, for example, AMF with MME, g-NodeB with e-NodeB, UDM with HSS etc. Similarly, the corresponding 5G procedures needs to be replaced by LTE procedures for example, registration procedure with attach procedure, registration procedure for mobility registration updating with TAU procedure, deregistration procedure with detach procedure and so on. But principles of the solution remain the same.

An example list of NAS messages may be, but not limited to, REGISTRATION REQUEST message; DEREGISTRATION REQUEST message; SERVICE REQUEST message; CONTROL PLANE E SERVICE REQUEST; IDENTITY REQUEST; AUTHENTICATION REQUEST; AUTHENTICATION RESULT; AUTHENTICATION REJECT; REGISTRATION REJECT; DEREGISTRATION ACCEPT; SERVICE REJECT; SERVICE ACCEPT, and so on.

The Network used in this disclosure is explained using any 5G Core Network Function for example, AMF. However, the network could be any 5G/EUTRAN Core Network Entities like AMF/SMF/MME/UPF, or the Network could be any 5G/EUTRAN RAN Entity like eNodeB (eNB) or gNodeB (gNB) or NG-RAN etc.

The messages used or indicated in this disclosure are shown as an example. The messages could be any signaling messages between UE and the Network Functions/Entities or between different Network functions/entities.

The term area/location/geographical area are used in this disclosure may refer to any of cell/cell ID, TAC/TAI, PLMN, MCC/MNC, Latitude/longitude, CAG cell or any geographical location/coordinate.

The 3GPP Technical document and references and the version number given in this disclosure are for reference/example and may be present in or refer to any of the 3GPP Technical documents or references.

The methods, issues or solutions disclosed in this disclosure are explained using NR access or NG-RAN Access Technology as an example and is not restricted or limited to NR access only. However, the solutions proposed in this disclosure are also applicable for E-UTRAN access Technology, NB-S1 mode or WB-S1 mode via E-UTRAN access and/or NB-IoT or WB-IoT Access/Architecture.

The solutions defined for NR (5GC) are also applicable to legacy RATs like E-UTRA/LTE, the corresponding CN entities needs to be replaced by LTE entities for example, AMF with MME, g-NodeB with e-NodeB, UDM with HSS etc. But principles of the solution remain the same.

The Network used in this disclosure is explained using any 5G Core Network Function for example, AMF. However, the network could be any 5G/EUTRAN Core Network Entities like AMF/SMF/MME/UPF, or the Network could be any 5G/EUTRAN RAN Entity like eNodeB (eNB) or gNodeB (gNB) or NG-RAN etc.

The messages used or indicated in this disclosure are shown as an example. The messages could be any signaling messages between UE and the Network Functions/Entities or between different Network functions/entities.

The terms camp and register are used interchangeably and have the same meaning.

The solutions and procedures defined in this disclosure are illustrated using 5G or LTE as an example. It could be any applicable for any RAT(s)/Access, but the core principles remain the same.

The terms camp, register, attach and tracking area update (TAU) are interchangeably used in this disclosure and have the same meaning.

The solutions and procedures defined in this disclosure are illustrated using one of cell(s), RAT(s), PLMN(s) and Access(es) as an example. It could be applicable for any Network or Network Entity and the core principle remains the same.

The term area as used in this disclosure may refer to any of cell/cell ID, TAC/TAI, PLMN, MCC/MNC, Latitude/longitude, any CAG/CAG identifier or any geographical location/coordinate.

For the list of possible NAS messages please refer to 3GPP TS 24.501 or 3GPP TS 24.301, for list of AS messages please refer to 3GPP TS 38.331 or 3GPP TS 36.331.

The cause names in this disclosure are for illustration purpose and it may have any name. The NAS messages and AS messages described in this disclosure is only for illustration purpose it may be any NAS or AS messages as per defined protocol between UE and AMF/MME or UE and gNB (NG-RAN/any RAN node)/eNB.

The term Network as used in this disclosure may refer to any PLMN, RAT, Access, Access Technology or any combination of these.

The term NTN or NR/E-UTRAN Satellite Access Network as used in this disclosure may refer to any of the NR Satellite Access Network or E-UTRAN Satellite Access Network or NR Satellite Access Technology or E-UTRAN Satellite Access Technology.

The term NTN or NR/E-UTRAN Satellite Access Network as used in this disclosure may refer to any of the NR Satellite Access Network or E-UTRAN Satellite Access Network or NR Satellite Access Technology or E-UTRAN Satellite Access Technology.

As used herein, the term "network" may refer to one or more of a PLMN or a RAT or an access or a system or a RAN or a band or a frequency or a cell or a network entity or a network function or any TN or any NTN or any component of the network.

As used herein, the term "non-terrestrial network (NTN)" may refer to one or more of a non-terrestrial PLMN or a non-terrestrial RAT or a non-terrestrial access or a non-terrestrial system or a non-terrestrial RAN or a non-terrestrial band or a non-terrestrial frequency or a non-terrestrial cell or a non-terrestrial Network entity or a non-terrestrial network function or a component of a non-terrestrial network or a network other than TN or a network on Satellite Access Network.

As used herein, the term "terrestrial network (TN)" may refer to one or more of a terrestrial PLMN or a terrestrial RAT or a terrestrial access or a terrestrial system or a terrestrial RAN or a terrestrial band or a terrestrial frequency or a terrestrial cell or a terrestrial Network entity or a terrestrial network function or a component of a terrestrial network or a Network other than NTN or a network other than Satellite Access Network.

As used herein, the term "user equipment (UE)" may refer to one or more of an NTN-capable UE or a UE capable of availing a NTN service or a UE supporting NTN technology or a UE capable of getting NTN services using technologies other than NTN technology or a UE capable of availing a NTN service which is deployed using a 3GPP Satellite or NTN system or a UE capable of availing a NTN service which is deployed using a NTN Network deployed using any 3GPP technology or a UE capable of availing a NTN service which is deployed using any proprietary NTN implementation outside the scope of 3GPP NTN system or a UE having a usage setting as a voice centric UE or a UE configured to send or to receive attach type as combined international mobile subscriber identity (IMSI) or a UE configured to send or to receive attach type as combined IMSI with SMS only.

As used herein, the term "registration procedure" is associated with registration or camping of a UE in a 5G network.

As used herein, the term "attach procedure" is associated with registration or camping of a UE in a 4G network or long-term evolution (LTE) network.

As used herein, the term "detach" is associated with de-registration or detaching of a UE in a 4G Network or an LTE network.

As used herein, the term "deregistration" is associated with de-registration or detaching of a UE in a 5G Network or a NR network.

As used herein, "camping" or "registering" to a network or network cell refers to the process by which a UE (for example, a mobile phone or tablet or the like) connects to a specific cellular network and becomes associated with that network. It may also refer to a procedure where the UE has completed the cell/Network selection/reselection process and has chosen a cell/Network from which it plans to receive all available services. It may also refer to a process of selecting a cell of the PLMN/Network and doing any necessary procedures (for example, location registration) to avail services from the Network.

As used herein, a "voice-centric user equipment (UE)" may refer to a UE with support for voice services for example, IP multimedia system (IMS) voice or any other voice services.

As used herein, a "non-availability of a TN coverage at the location of the UE" may refer to a situation where there may be no terrestrial network available at the location of the UE or there may be terrestrial network(s) available in the location of the UE but those Terrestrial Network may not be suitable or allowable for the UE for getting normal services (for example, UE may not be able to get normal services (for example, full set of services such as voice, data, SMS, etc.) from those terrestrial network. Those terrestrial network may be a part of a forbidden list present in the UE). The UE may assume that the UE is in a location where TN coverage is not available.

As used herein, a "presence of the UE in an NTN only coverage area" may refer to a situation where there may be only non-terrestrial network available at the location of the UE or there may be NTN available at the location of the UE and there may be terrestrial network(s) available in the location of the UE but those TN may not be suitable or allowable for the UE for getting normal services (for example, UE may not be able to get normal services (for example, full set of services such as voice, data, SMS, etc.) from those terrestrial network.

As used herein, an "allowable network" for the UE may be those network(s) which are not a part of any of the back-off network list or a forbidden network list or a temporary back-off/forbidden network list of the UE. It may refer to a network on which UE is allowed to camp or register to get normal or full services.

As used herein, packet switching (PS) mode and circuit switching (CS) mode are the two different types of traffic modes that devices (or UEs) may use to access the network.

As used herein, the N1 mode refers to the standalone mode with a direct connection between the 5G RAN and 5G CN. In the N1 mode, the NG interface is used between RAN and 5GCN.

As used herein, the S1 mode is associated with the Evolved Packet System (EPS) and uses the 4G core network. In S1 mode, the 4G S1 interface is used between RAN and EPC.

As used herein, a "temporary forbidden PLMN list" refers to a list of PLMNs stored at the UE. The list indicates the PLMNs the UE is temporarily configured to avoid camping or registering. The list indicates the list of PLMN(s) which are not a part of allowable PLMN(s) of the UE. The UE may not be allowed to register or attach to the list of the PLMN(s) which are a part of "temporary forbidden PLMN list" for normal services.

As used herein, the back-off timer in the 3GPP standard is a mechanism used to control the frequency of retransmissions in a wireless communication system. The back-off timer is mainly utilized to alleviate the overload of the mobility management entity (MME) or AMF or a RAN entity (for example, g-NodeB or NG-RAN or eNodeB, etc.) and to resolve congestion at the serving gateway (S-GW), or the SMF or the UPF or the packet data gateway (P-GW).

As used herein, the non-3GPP inter-working function (N3IWF) interface in the 5G SBA (service based architecture) is responsible for interworking between untrusted non-3GPP networks and the 5G core. N3IWF facilitates seamless handover and uninterrupted connectivity for users when they transition between different network types.

As used herein, the evolved packet data gateway (ePDG) is responsible for interworking between the evolved packet core (EPC) and untrusted non-3GPP networks that require secure access, such as Wi-Fi, long-term evolution (LTE) metro, and femtocell access networks.

Figure 4:
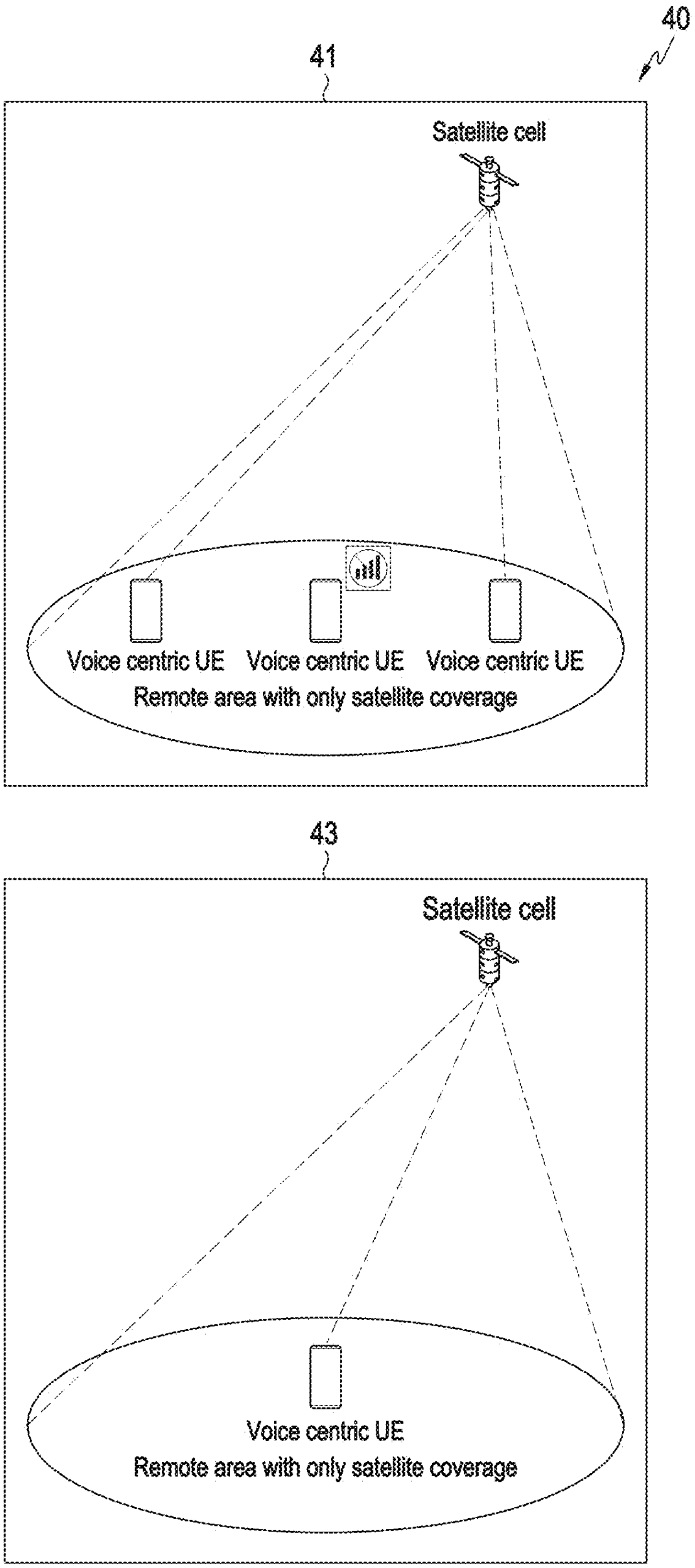
FIG. 4 illustrates a comparison of a prior art implementation scenario with an implementation scenario of an example embodiment, in accordance with an example embodiment of the disclosure.

FIG. 4 illustrates a comparison of a prior art implementation scenario with an implementation scenario of an example embodiment.

As illustrated in the exemplary scenario 41 in accordance with a prior art implementation scenario, the voice-centric UE performs registration to the NTN, but the network indicates that voice services are not supported. As per the existing techniques and standards, the voice-centric UE disables N1 mode (or similarly S1 mode or any RAT mode) capabilities and performs cell/PLMN/RAT/Access search or selection for voice service in alternate cell/PLMN/RAT/Access The process of performing cell/PLMN/RAT/Access search or selection for voice service in alternated cell/PLMN/RAT/Access causes unnecessary delays in acquiring the NTN services. In the event that no other cell/PLMN/RAT/Access is available on a RAT/PLMN/Network, the UE re-enables N1 mode (or similarly S1 mode or any RAT mode) and camps back to the NTN (for example, same or a different NTN) after delay. This is associated with unnecessary delays in camping and registering/attaching for NTN services and power consumption at the voice-centric UE.

As illustrated in the exemplary scenario 43 in accordance with an example embodiment of the disclosure, the voice-centric UE is configured to remain camped and/or registered to the NTN without any delay in acquiring the NTN services. Further, the voice-centric UE does not perform unnecessary cell/PLMN/RAT/Access/Network searches or selection and remains registered/attached to the NTN, thereby providing faster and stable NTN services in comparison with existing techniques.

Figure 5:
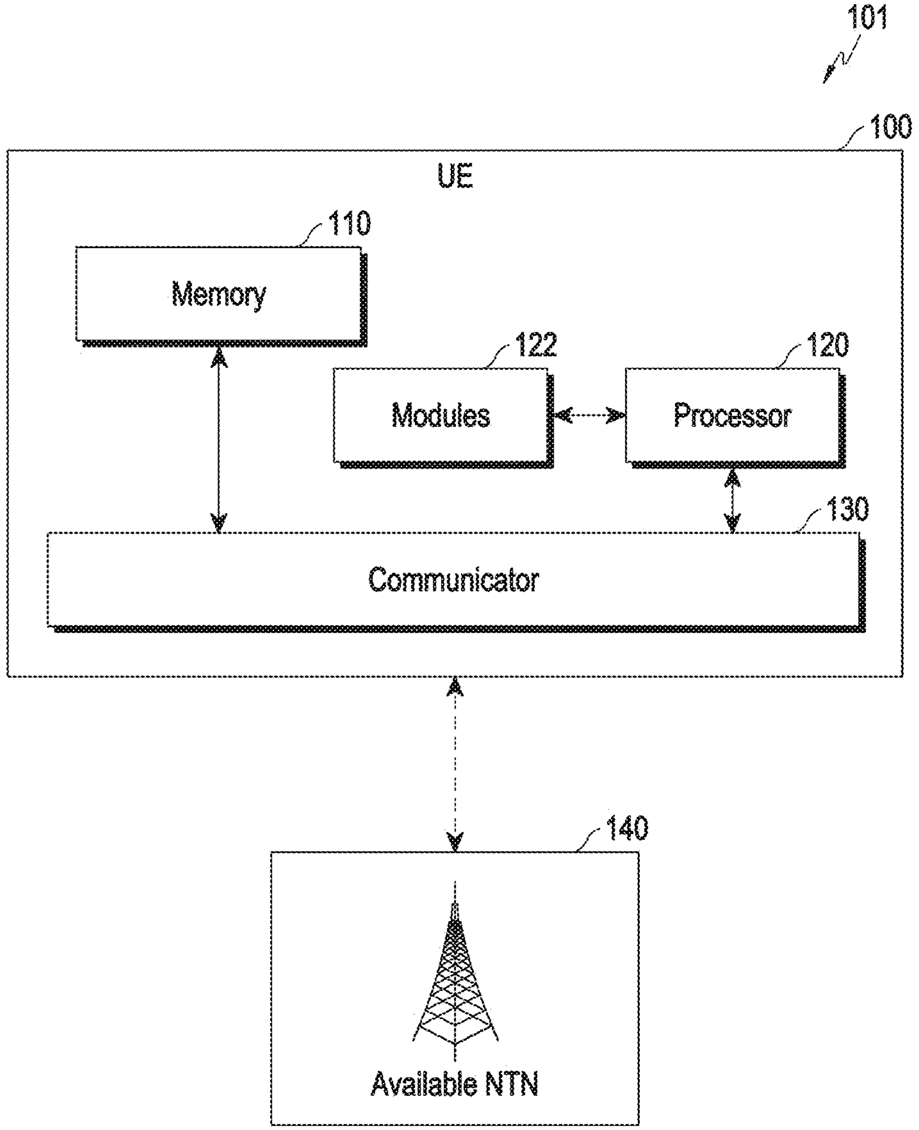
FIG. 5 illustrates a system block diagram of a User Equipment (UE) configured to handle a NTN connection, in accordance with an example embodiment of the disclosure.

FIG. 5 illustrates a system block diagram where a UE 100 is configured to handle a NTN connection, in accordance with an example embodiment of the disclosure. In an example, the UE 100 may include devices, but not limited to, a smartphone, a tablet computer, a personal digital assistance (PDA), an internet of things (IoT) device, a wearable device, and any other electronic communication device which may be capable of connecting to an NTN. In an embodiment, the UE 100 may include a memory 110, a processor 120, and a communicator 130 as illustrated in FIG. 5.

In an embodiment, the memory 110 stores instructions to be executed by the processor 120 to handle a NTN connection for the UE 100, as discussed throughout the disclosure. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In certain examples, a non-transitory storage medium may store data that may, over time, change (e.g., in random access memory (RAM) or cache). The memory 110 may be an internal storage unit, or it may be an external storage unit of the electronic device (100), a cloud storage, or any other type of external storage.

The processor 120 communicates with the memory 110 and the communicator 130. The processor 120 is configured to execute instructions stored in the memory 110 and to perform various processes for handling a NTN connection for the UE 100, as discussed throughout the disclosure. The processor 120 may correspond to one processor or a plurality of processors, which may correspond to a general-purpose processor, such as a central processing unit (CPU), an application processor (AP), or the like, a graphics-only processing unit such as a graphics processing unit (GPU), a visual processing unit (VPU), and/or an artificial intelligence (AI) dedicated processor, such as a neural processing unit (NPU).

The communicator 130 is configured for communicating internally between internal hardware components and with external devices (e.g., server) via one or more networks (e.g., radio technology). The communicator 130 may include an electronic circuit specific to a standard that enables wired or wireless communication.

In one or more embodiments, the processor 120 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The modules 122, in conjunction with the processor 120, may be configured to perform the one or more methods as disclosed herein. In an example embodiment, the modules 122 may store instructions, which when executed by the processor 120, may perform the one or more method as discussed herein.

In one or more embodiments, a function associated with the various components of the UE 100 may be performed through the non-volatile memory, the volatile memory, and the processor 120. One or a plurality of processors controls the processing of the input data in accordance with a specified operating rule or AI model stored in the non-volatile memory and the volatile memory. The specified operating rule or AI model is provided through training or learning. Here, being provided through learning means that, by applying a learning algorithm to a plurality of learning data, a specified operating rule or AI model of the desired characteristic is made. The learning may be performed in a device itself in which AI according to an embodiment is performed, and/or may be implemented through a separate server/system. The learning algorithm is a method for training a predetermined target device (for example, a robot) using a plurality of learning data to cause, allow, or control the target device to decide or predict. Examples of learning algorithms include, but are not limited to, supervised learning, unsupervised learning, semi-supervised learning, or reinforcement learning.

The AI model may include a plurality of neural network layers. Each layer has a plurality of weight values and performs a layer operation through a calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

Although FIG. 5 shows various hardware components of the UE 100, it is to be understood that other embodiments are not limited thereon. In other embodiments, the UE 100 may include less or a greater number of components. Further, the labels or names of the components are used only for illustrative purposes and do not limit the scope of the disclosure. One or more components may be combined to perform the same or substantially similar functions to handle a NTN connection for the UE 100.

Further, as illustrated in FIG. 5, the available NTN 140 may correspond to an NTN system or several NTN cells. In an embodiment, wherein the NTN 140 includes at least one of: LEO, MEO, GEO, HAPS, unmanned aerial vehicle (UAV), UAS, a network supported by an airborne vehicle, a network deployed using the 3GPP Satellite or NTN system, a NTN network deployed using at least one 3GPP technology (for example, a 3GPP based Satellite system or a NTN Network deployed using a LTE network, etc.) and a NTN network deployed using at least one NTN implementation outside the scope of 3GPP NTN system (for example, a NTN deployed using an operator server or application. etc.).

Figure 6:
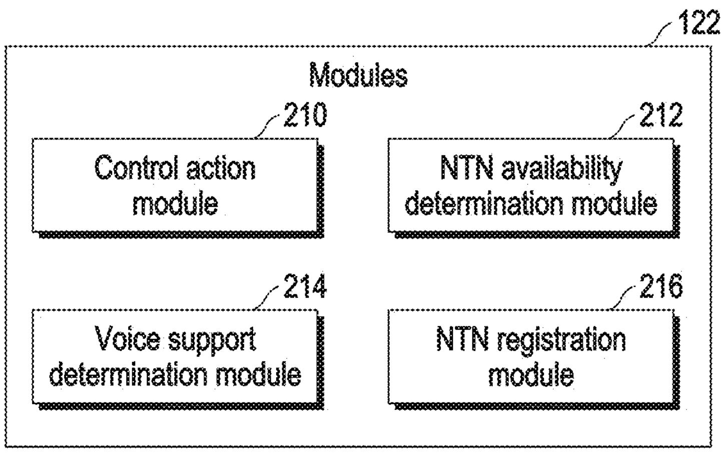
FIG. 6 illustrates the modules configured to handle a NTN connection at a voice-centric UE, in accordance with an example embodiment of the disclosure.

FIG. 6 illustrates the modules configured to handle a NTN connection at a voice-centric UE, in accordance with an example embodiment of the disclosure. As illustrated in FIG. 6, the modules 122 may include a control action module 210, an NTN availability determination module 212, a voice support determination module 214, and an NTN registration module 216. The embodiments may be described and illustrated in terms of blocks, as shown in the drawings, which carry out a described function or functions. These blocks, which may be referred to herein as (the control action module 210, the NTN availability determination module 212, the voice support determination module 214, and the NTN registration module 216) or the like may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Figure 7:
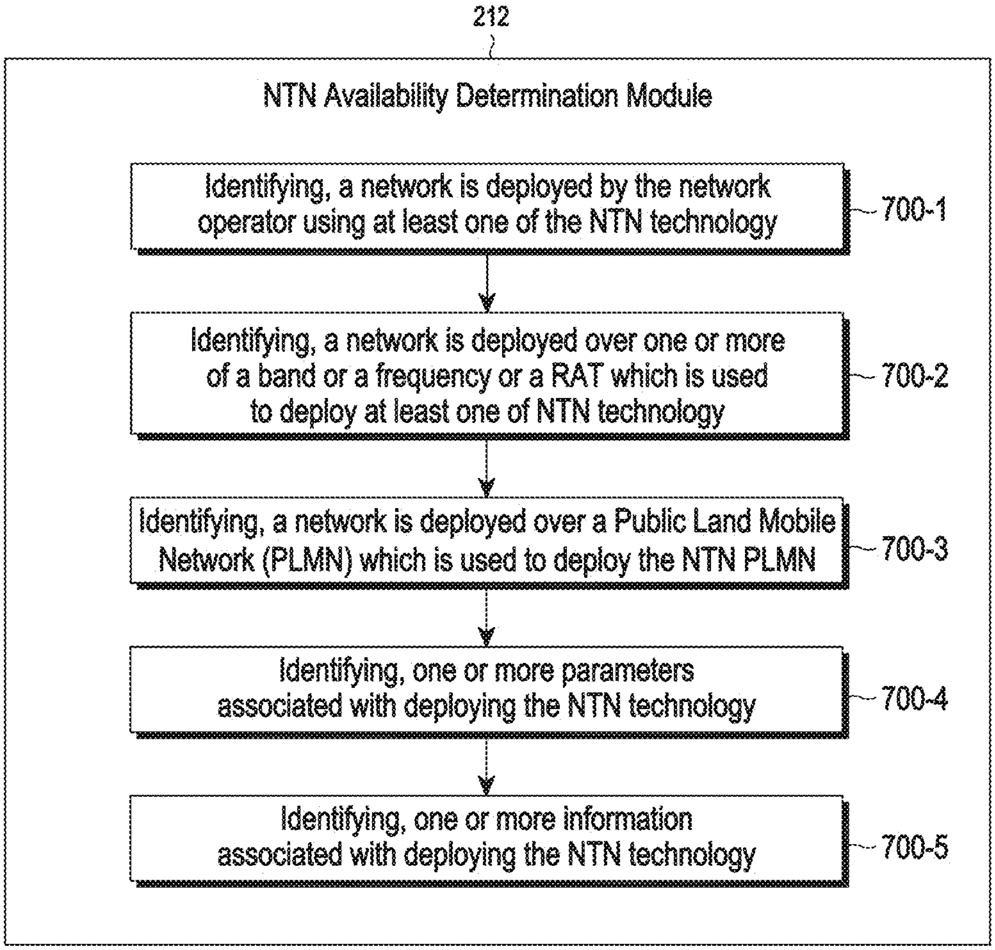
FIG. 7 illustrates a process flow for identifying the availability of NTN cells around the voice-centric UE by the NTN availability determination module of the UE, in accordance with an example embodiment of the disclosure.

The working and process flow performed by the NTN availability determination module 212 is explained in the description provided with FIG. 7. Similarly, the working and process flow performed by the voice support determination module 214 is explained in the description provided with FIG. 8. Additionally, the working and process flow performed by the NTN registration module 216 is explained in the description provided with FIG. 9.

In one or more embodiments of the disclosure, the control action module 210 may be configured to perform at least one control action, as discussed throughout the disclosure. The control actions may be performed in different combinations and sequences. FIGS. 10-16 illustrate the sequence and combination of steps/operations to be performed by the control action module 122 in accordance with some embodiments of the disclosure. The FIG. 16A-16D illustrate the sequence and combination of steps/operations to be performed by the control action module 122 in accordance with some alternate embodiments of the disclosure In an example embodiment of the disclosure, the one more control action to be performed by the control action module 210, in any order and combination, may include control actions, such as avoiding initiation of a back-off timer for the selected NTN 140. The control actions may further include avoiding addition of the selected NTN 140 (for example, the selected/registered NTN PLMN or NTN cell) to a back-off Network list (for example, Backoff cell/PLMN list) or a temporary forbidden Network list (for example, a temporary forbidden PLMN/Cell list) or a forbidden network list (for example, a forbidden PLMN list (FPLMN list) or a forbidden Cell list) in the UE 100. The control actions may further include remaining registered (for example, remaining camped or registered or attached) to the selected/registered NTN 140 (for example, NTN PLMN/cell). The control actions may further avoid performing one or more of a detach or a deregistration procedure on the selected NTN 140 (for example, the UE may not perform a detach or a deregistration procedure after being attached/registered to the PLMN/cell providing NTN services). The control actions may further include avoiding performing one or more of a subsequent attach procedure or a subsequent registration procedure or a subsequent TAU procedure or multiple attach procedure or multiple registration procedures or multiple TAU procedures on the selected NTN 140 (for example, UE may remain registered/attached to the PLMN/cell providing NTN services and may not perform another or subsequent or multiple Attach Procedure or a Registration Procedure (for example, with registration type as Mobility registration updating) or a TAU procedure after being attached/registered to the PLMN/cell providing NTN services). The control actions may further include avoiding disabling of one or more of a RAT or an N1 mode or a S1 mode associated with the UE 100 associated with the selected NTN 140 (for example, the UE may not disable the N1 mode for the registered PLMN if the registered PLMN/Cell is not providing voice services over 5G or NR. In a similar way, the UE may not disable the S1 mode for the registered PLMN if the registered PLMN/Cell is not providing voice services over 4G or LTE). The control actions may further include avoiding searching for one or more of an alternate Network (for example, the UE shall not search or select for any other or alternate cell(s)/PLMN(s)/RAT(s)/Access(es)/Network(s) while being registered/attached for NTN services) or a RAT or a PLMN or a cell or an access associated with the selected NTN 140 (for example, the UE shall not search or select for any other or alternate cell(s)/PLMN(s)/RAT(s)/Access(es)/Network(s) for the registered PLMN/Cell/Network). The control actions may furthermore include modifying a usage setting of the UE 100 from the voice-centric usage setting to a data-centric usage setting (for example, while being camped/registered or while registering/attaching on the NTN PLMN) and indicating the modified usage setting to the selected NTN 140 in an AS or a NAS signaling message (for example, ATTACH REQUEST message or REGISTRATION REQUEST message or TAU REQUEST message, etc.).

The control actions may furthermore include registering for SMS only services and indicating the SMS only services setting (for example, using a bit or an IE for example, indicate the SMS only requested bit to "SMS only" in the additional update type IE) to the NTN 140 in an AS or a NAS signaling message (for example, ATTACH REQUEST message or REGISTRATION REQUEST message or TAU REQUEST message, etc.). The control actions may furthermore include modifying a service request (for example, a registration request or an Attach request or a TAU request parameters for example, based on modified UE setting) based on the one or more services supported by the NTN (for example, while being camped or registered or while registering/attaching on the NTN PLMN/cell/network) and indicating the modified service request to the NTN 140 in an AS or a NAS signaling message. (for example, ATTACH REQUEST message or REGISTRATION REQUEST message or TAU REQUEST message, etc.). The control actions may furthermore include modifying one or more of a service/registration request based on the one or more services supported by the NTN or a modified UE setting or a usage setting of the UE 100 from the voice-centric usage setting to a data-centric usage setting while pre-determining that the absence of voice service support at the NTN PLMN/cell/Network. The control actions may furthermore include modifying a UE mode associated with the UE 100 from one or more of a PS mode 1 and a CS/PS mode 1 to one or more of PS mode 2 and CS/PS mode 2. The control actions may furthermore include performing one or more of a detach or a deregistration followed by one or more of an attach or a registration on the selected NTN (140) with modified UE setting (for example, the UE may modify its settings based on the voice services availability/unavailability from the NTN Cell/PLMN/Network and may further indicate the modified UE setting to the NTN by performing a detach/deregistration procedure followed by an attach/registration procedure on the same/registered/selected or a different NTN/PLMN/Cell/RAT/Access/Network). The control actions may furthermore include performing one or more of a registration procedure with registration type as mobility registration updating or a TAU procedure on the selected NTN 140 with modified UE setting (for example, the UE may modify its settings based on the voice services availability/unavailability from the NTN Cell/PLMN/Network and may further indicate the modified UE setting to the NTN by performing a registration procedure with registration type as mobility registration updating or a TAU procedure on the same/registered/selected or a different NTN/PLMN/Cell/RAT/Access/Network). The control actions may furthermore include performing one or more of a detach procedure with an indication of re-attach required or a deregistration procedure with an indication of re-registration required followed by one or more of a re-Attach (for example, a subsequent Attach procedure) or a Re-Registration procedure (for example, a subsequent Registration procedure) on the selected NTN 140 with modified UE setting (for example, the UE may modify its settings based on the voice services availability/unavailability from the NTN Cell/PLMN/Network and may further indicate the modified UE setting to the NTN by performing a detach/deregistration procedure with indication for re-attach/re-registration required followed by an attach/registration (for example, a re-attach or a re-registration) procedure on the same/registered/selected or a different NTN/PLMN/Cell/RAT/Access/Network).

The control actions may furthermore include modifying a SMS configuration to prefer to use SMS over IP networks (or to use SMS over NAS signaling) and indicating the modified SMS configuration to the NTN 140 in an AS or NAS signaling message (for example, ATTACH REQUEST message or REGISTRATION REQUEST message or TAU REQUEST message, etc.).

In an embodiment of the disclosure associated with services from non-3GPP networks, the control actions may furthermore include searching for one or more of a non-3GPP network(s) (for example, while being camped or registered or while registering/attaching on the NTN PLMN/ cell/network). Next, in the embodiment, the control action may include modifying a service configuration associated with the UE 100. Thereafter, in the embodiment, the control action may include modifying an access network preference configuration associated with the UE 100 from a N3IWF to an evolved packet data gateway (ePDG). In an embodiment, the UE may perform any of the control actions in any order or combination (for example, the UE may use multiple control actions in a situation in any sequence. The UE may combine any number of control actions in any suitable way and make a new control action, if needed.)

In an embodiment, a proposed solution depicts another method when a voice centric UE performs cell search in NTN coverage area, according to an embodiment of the disclosure. The method shows that a voice centric device either is currently in no service or moves from a TN coverage to NTN coverage and is present in NTN only coverage area and no TN coverage is available. The device performs cell search in NTN coverage area and if the NTN cell is not found the device remains in no service. If the device found the NTN cell, the device performs registration procedure in NTN network. The device may also use initial registration based on various embodiments as mentioned below in later paragraphs, if the device may not predetermine that the NTN cell doesn't support voices.

Further, the NTN network notifies the devices that Voice services are not supported by the NTN cell. Furthermore, the device executes at least one of the below mentioned solutions in any order or combination thereof and the device gets faster and stable NTN services.

Then, the device further detects if there is availability of the TN services or loses in NTN services. The device remains in NTN service, if the device does not detect any TN services or loses in NTN services. If the device detects any TN services or loses in NTN services, it is checked if the device is registered on TN cell. If device is not registered, the method is repeated. If the device is registered, the method ends.

The disclosure provides multiple methods to provide faster NTN services to voice centric devices. Using one or more combination of the below listed solutions, in any order, voice centric devices will be able to acquire quicker NTN services.

Solution 1: UE shall not start any back-off timer/3GPP timer and remain camped/registered on the PLMN for available NTN services (SMS or available services).

Solution 2: UE shall not disable either N1 mode capabilities (NG-RAN mode if camped on 5G) or S1 mode capabilities (E-UTRAN mode if registered on 4G) in single registration mode or doesn't disable both in case of dual registration mode.

Solution 3: UE shall not search for alternate RAT(s) for the registered PLMN(s) or selected PLMN(s) or any other PLMN(s)/RAT(s).

Solution 4: UE may change the UE Usage setting to "Data Centric" temporarily while camped for NTN services. The UE may indicate the same to the Network via any signaling messages like TAU request or registration request (mobility registration update) or by initiating a DETACH (with optionally re-attach/re-registration required) followed by attach/registration procedure.

Solution 5: UE may trigger a DETACH (with optionally re-attach/re-registration required) followed by attach/registration procedure. The UE may attach/register for EPS only/5GS only services (i.e., without any combined attach or by setting the EPS attach type IE to "EPS attach", etc.) and may also indicate the SMS only requested bit to "SMS only" in the additional update type IE.

Solution 6: UE, upon identifying that available PLMN is a NTN PLMN, may register with SMS only services during initial registration with NTN RAT/PLMN if the NTN RAT(s) don't provide any other services apart from SMS as agreed between the operator, NTN provider and the UE. Similarly, the UE may set the attach/registration type to EPS only/5GS only or the UE usage setting to DATA CENTRIC during initial registration on the NTN RAT/PLMN itself to avoid any further delay or re-registration.

UE may follow one or more combinations of the above proposed solutions for faster NTN services when UE's usage setting is voice centric and NTN network doesn't support voice services.

UE may search for other NTN PLMN(s) or PLMN(s) but only for the NTN RAT(s). This may be done either before UE registers on the already camped NTN PLMN or UE may search for these NTN RAT(s) or PLMN combinations in the background while remaining registered on the NTN PLMN. The UE may use any historical database or AI/ML mechanism or Geo-Fencing data to determine which all PLMN(s) are providing NTN services in that area. If there is any NTN PLMN(s) providing voice services in those area based on database/AI-ML/Geo-Fencing data/UE search history, UE may prioritize searching those PLMN(s) over other PLMN(s).

UE may search for other NTN PLMN(s) or PLMN(s) but only for the NTN RAT(s). The search may be done either before UE registers on the already camped NTN PLMN or UE may search for these NTN RAT(s) or PLMN combinations in the background while remaining registered on the NTN PLMN. The UE may use any historical database or AI/ML mechanism or Geo-Fencing Data to determine which all PLMN(s) are providing NTN services in that area. If there is any NTN PLMN(s) providing voice services in those area based on database/AI-ML/Geo-Fencing data/UE search history, UE may prioritize searching those PLMN(s) over other PLMN(s).

Based on the network deployment and agreement for NTN services, while being registered on the NTN RAT/PLMN, the device (UE) may not periodically scan for other NTN RAT/PLMN(s) for voice services if the network may have partnership with limited NTN providers or vendors and device may only scan for PLMN or RAT which are available via terrestrial bands/frequencies when needed or determined (based on Geo-fencing data/database approach/AI/ML mechanisms or periodic scans) i.e. device may de-prioritize searching for NTN RAT/PLMN(s) when already registered on one NTN RAT.

In an embodiment of the proposed solution, the UE may also opt for below enhanced solutions for faster and better NTN services: UE may switch from any existing UE modes (like PS Mode 1 or CS/PS Mode1) to other UE modes (such as PS Mode 2 or CS/PS Mode 2) in which UE may remain registered for NTN services without searching for alternate RATs/PLMNs. UE may set its SMS configuration to prefer to use SMS over IP networks since CS (Circuit Switched) services won't be available in NTN Networks.

In another approach, UE may remain registered for NTN services with available services (SMS only services/no voice services) and in parallel search for non-3GPP access if voice services are available for non-3GPP access (like voice-over-WiFi). While searching for non-3GPP access, UE may set its preference to use/prefer ePDG over N3IWF if both are available (as N3IWF would connect to 3GPP networks and Voice services are not available over 3GPP NTN networks) or change its preference to ePDG if preference was set to use N3IWF.

In an embodiment, the proposed solution depicts another method to acquire quicker NTN services, according to an embodiment of the disclosure.

When a voice centric UE performs registration on an NTN cell and gets SMS only services/no voice services, the device will not start any back-off timer or 3GPP timer for the registered PLMN or RAT (i.e., NTN PLMN) or shall not add the registered PLMN or RAT (i.e., NTN PLMN) into any Back-off/temporary forbidden PLMN List while obtaining voice services in other cells or RAT. UE will remain camped/registered on the NTN PLMN for available NTN services (i.e., SMS only or any other available services).

The UE may not start back-off timer/add the registered PLMN to any Back-off or temporary forbidden PLMN List or may not deregister from the registered NTN PLMN/RAT and may remain camped to the NTN cell because there is no another cell available for voice services. The UE may search for voice services over other NTN cells, if required, in background while remaining camped on NTN PLMN/Cell.

Since UE may not start any back-off or 3GPP timer for the current registered NTN PLMN for searching alternate cells that provide voice services, it saves battery resources required for scanning all RATs and associated Bands/frequencies. The device remains camped to the only available NTN cell and avoids unnecessary delay that might have occurred during search for voice services.

In an embodiment, the proposed solution depicts another method to acquire quicker NTN services, according to an embodiment of the disclosure.

When "voice services not supported" indication is received from NTN network by the voice centric UE, the UE may not disable N1 Mode capabilities (NG-RAN mode) in Single Registration Mode. The UE remains registered to the NTN cell with SMS only service or any other service that is provided by the NTN cell. The UE doesn't have to disable NG-RAN capabilities and search for voice services in other RATs because there may not be any terrestrial/non-terrestrial network coverage available for voice services.

The UE may not unnecessarily disable and re-enable N1 mode capabilities. As a result, it avoids the delay incurred during this scenario while camping onto NTN network. This approach helps UE to get faster and stable NTN service access.

In an embodiment, the proposed solution depicts another method to acquire quicker NTN services, according to an embodiment of the disclosure.

When the voice centric UE performs registration on the NTN cell that does not support IMS Voice, the UE shall not search for alternate RATs for the registered PLMN and remain camped to the NTN cell for the available services (i.e., SMS only or other services). Since terrestrial networks have higher priority than NTN network, a device camps to NTN network only when there is on terrestrial network coverage available. Therefore, when UE searches for voice services in alternate RATs (TN), it may be just a redundant search, and UE may not find any suitable cell/RAT for voice services.

Since UE does not search for alternate cells/RATs that provide voice services, it saves battery resources which might have been used for scanning all RATs and associated Bands/frequencies. Moreover, UE will select only the available NTN cell for camping and thereby reducing delay in the time required for camping to NTN network.

In an embodiment, the proposed solution depicts another method to acquire quicker NTN services, according to an embodiment of the disclosure.

When a voice centric UE performs registration on an NTN cell not supporting voice services, the registration request is either accepted or rejected indicating that voice services are not supported by the NTN cell. During this scenario, the UE may change the UE usage setting to "Data Centric" temporarily while camped onto the NTN cell for the available services.

To indicate the change in the usage setting, the UE may indicate the same to the network via any signaling messages like registration request with mobility registration update or by initiating a DETACH (with optionally re-registration required) followed by registration procedure with modified UE usage setting. Once the UE is back to TN, it will revert its setting back to voice centric.

Using this approach, the UE would remain camped to the NTN cell for the available services regardless of IMS voice service availability. The UE does not unnecessarily search for voice services in other cells/RATs and obtains faster NTN services.

In an embodiment, the proposed solution depicts another method to acquire quicker NTN services, according to an embodiment of the disclosure.

When the voice centric UE performs registration on an NTN cell not supporting voice services, the registration request is accepted or rejected indicating that voice services are not supported by the NTN cell. During this scenario, UE may trigger re-registration or trigger a DETACH (with optionally re-registration required) followed by registration procedure.

During the registration procedure, the UE may register for 5GS only services (i.e., PS only services without any request for voice services.) and may also indicate the SMS only requested bit to "SMS only" in the additional update type IE.

Since only SMS services (or any other services except voice services) is requested, the UE remains camped to the NTN network without any delay in acquiring NTN services. Since the UE performs Registration only for SMS services (or other services except voice services) the UE would remain camped to the NTN cell for the available services without any delay which occurs during disabling of N1 mode capabilities as per 3GPP Specification during this scenario. The UE does not unnecessarily search for voice services in other cells/RATs which are not available in NTN only coverage area and obtains faster NTN services in NTN coverage location.

In an embodiment, the proposed solution depicts another method to acquire quicker NTN services, according to an embodiment of the disclosure.

The voice centric UE knows beforehand/pre-determines (based on operator deployment/agreement or any configuration/pre-configuration or any historical camping database or using any AI/ML Techniques) that the available NTN cell will not support voice services as per agreement with the operator, NTN provider and the UE. In this case, UE may register with SMS only services during initial/first/mobility registration with NTN RAT/PLMN. Additionally, the UE may set the Registration type to 5GS only and set the UE usage setting to "Data Centric" during initial/first registration on the NTN RAT/PLMN itself to avoid any further delay or re-registration.

Since the UE performs registration only for SMS services during the initial registration, the UE avoids delay caused during alternate cell search for voices services as defined in 3GPP specification. With this approach, the UE may not perform any re-registration and acquires quicker and stable NTN services.

The UE may follow one or more combinations of the above embodiments (first method-sixth method) for faster NTN services when UE's usage setting is Voice Centric and NTN network doesn't support voice services.

FIG. 7 illustrates a process flow for identifying the availability of NTN cells around the voice-centric UE by the NTN availability determination module of the UE, in any order or combination, in accordance with an example embodiment of the disclosure.

At operation 700-1, the NTN availability determination module 212 may be configured to identify a Network (for example, cell/PLMN/RAT/Access) deployed by the network operator using one or more of the NTN technologies.

At operation 700-2, the NTN availability determination module 212 may be configured to identify a Network (for example, cell/PLMN/RAT/Access) is deployed over one or more of a band or a frequency or a RAT (for example, which is used to deploy at least one of NTN technology for example, the NTN deployment may be done by the network operators or the satellite vendors over specific or explicit bands or frequencies or RAT(s) or combination of these which may be used only for NTN and not for TN, for example, the Network operator may use Band-X of RAT-Y to deploy NTN network and if UE selects or determines that a network (for example, Cell/PLMN) is deployed using band-X or RAT-Y or band-X or RAT-Y, it is a NTN).

At operation 700-3, the NTN availability determination module 212 may be configured to identify a network (for example, cell/PLMN/RAT/Access) that is deployed over a PLMN (for example, which is used to deploy the NTN PLMN, for example, the NTN deployment may be done by the network operators or the satellite vendors over specific or explicit PLMN(s) which may be used only for NTN and not for TN. For e.g. the Network operator may use PLMN P1 to deploy NTN network and if UE selects or determines that a network (for example, Cell/PLMN) is deployed using PLMN P1, it is an NTN).

At operation 700-4, the NTN availability determination module 212 may be configured to identify one or more parameters associated with deploying the NTN technology.

At operation 700-5, the NTN availability determination module 212 may be configured to identify one or more information associated with deploying the NTN technology.

In an example embodiment, the NTN availability determination module 212 may be configured to perform one or more of operations 700-1, 700-2, 700-3, 700-4, and 700-5 illustrated in FIG. 7.

At operation 700-2 and operation 700-3, the NTN availability determination module 212 may be further configured to perform the identification based on an agreement between a network operator, an NTN vendor, and the UE 100. In an embodiment, the UE may determine the information of the network (for example, Cell/Band/Frequency/RAT/PLMN/Access, etc.) on which the NTN is deployed using an indication from the network or an indication from any of the servers or an information configured or pre-configured in the UE.

At operation 700-4, the NTN availability determination module 212 may be configured to identify the deployment of the NTN technology on the basis of identification or determination or reception of one or more parameters by the UE 100. The one or more parameters may include a broadcast parameter, a system information block (SIB) parameter, a NAS signaling parameter, and an AS signaling parameter. Further, the NTN availability determination may be performed by the NTN availability determination module 212 based on the network parameters and network conditions such as: a band used by an operator or a satellite vendor for deploying a satellite service or an NTN service; a PLMN used by an operator or a satellite vendor for deploying a satellite service or an NTN service; a frequency used by an operator or a satellite vendor for deploying a satellite service or an NTN service; a RAT used by an operator or a satellite vendor for deploying a satellite service or an NTN service; a network deployed using any of an NTN technology; a network used by a satellite vendor for deploying a satellite service or an NTN service.

At operation 700-5, the NTN availability determination module 212 may be configured to identify or to determine the deployment of the NTN technology on the basis of identification or reception of one or more information associated with deploying the NTN technology. The one or more information may include: an information regarding configuration for NTN deployment in the UE; an information regarding configuration for NTN deployment as indicated by the network; an information regarding configuration for NTN deployment as configured in a subscriber identity module (SIM); an information regarding configuration for NTN deployment as indicated by a server; an information regarding configuration for NTN deployment as indicated by an application function; an information from a database where the database contains information indicating details of a satellite or NTN cell, its location, its availability/unavailability time and its deployment details; an information generated by a machine learning or an artificial intelligence model to predict or determine a network type; an information acquired using a data driven technique to predict or determine a network type.

The NTN availability determination module 212 in the UE 100 is thereby configured to determine the availability of a network (for example, cell/PLMN/RAT/Access) associated with the NTN technology for a voice-centric UE 100. The embodiment is of particular relevance in a scenario with no voice support service in an alternate RAT and a TN is not available to the voice-centric UE 100. Further, the deployment of the NTN service is based on an agreement among a network operator, an NTN vendor, and the UE.

Figure 8:
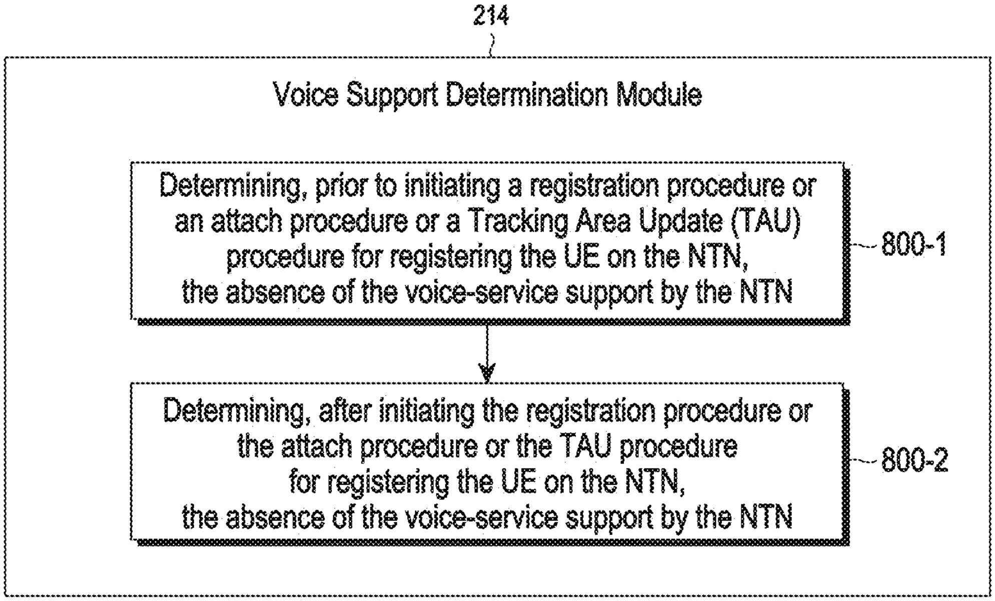
FIG. 8 illustrates a process flow for determining the support for voice services in a network by the voice support determination module of the UE, in accordance with an example embodiment of the disclosure.

FIG. 8 illustrates a process flow for determining the support for voice services in a network by the voice support determination module of the UE, in accordance with an example embodiment of the disclosure.

At operation 800-1, the voice support determination module 214 may be configured to determine, prior to initiating a registration procedure or an attach procedure or a TAU procedure for registering the UE 100 on the NTN 140, the absence of the voice-service support by the NTN 140.

At operation 800-2, the voice support determination module 214 may be configured to determine, after initiating the registration procedure or the attach procedure or the TAU procedure for registering the UE 100 on the NTN 140, the absence of the voice-service support by the NTN 140.

In an example embodiment of the disclosure, the voice support determination module 214 may be configured to determine the absence of voice-service support by the NTN 140, before or during or after the registration procedure or the attach procedure or the TAU procedure. The voice support determination module 214 may be configured to determine the absence of voice-service support based on one or more of an indication received by the UE 100 during the registration process. In an example, the one or more of an indication to determine the absence of voice support may include acceptance or rejection or indication to the UE 100 by the network via any of the signaling messages (like ATTACH ACCEPT/REJECT, REGISTRATION ACCEPT/REJECT, TRACKING AREA UPDATE (TAU) ACCEPT/REJECT and the like) to the effect that "IMS voice over PS sessions (VoPS) (for example, over S1 mode or over N1 mode) are not supported" or "Emergency Bearer Services (EMC-BS) (for example, over S1 mode or over N1 mode) are not supported". The network may also indicate that "SMS only" services are supported, for example, in the additional update result IE or indicate in any bit/IE that IMS voice support is not available in the network.

The voice support determination module 214 may be configured to determine the absence of voice-service support based on the configuration setting (for example, the UE may determine the voice-service support based on the camped/registered Network (for example, if the UE is camped/registered to a specific network (for example, Cell/PLMN/RAT/Band/Access, etc.), and if there is a configuration stored in the UE that the camped/registered network doesn't support voice services for the UE, the UE may determine the voice-service support of the camped/registered network)) for the UE 100. The voice support determination module 214 may be further configured to determine the absence of voice-service support based on a database comprising previous registration details of the UE 100. The voice support determination module 214 may be further configured to determine the absence of the voice-service support based on an artificial intelligence or machine learning (AI/ML) based mechanism. The voice support determination module 214 may be further configured to determine the absence of voice-service support based on an agreement between a network operator, an NTN or a Satellite vendor, and the UE 100.

Furthermore, the voice support determination module 214 may be configured to determine the absence of voice-service support based on or more parameters or information identified or received by the UE 100, and may include one or more of the following: a broadcast parameter; a SIB parameter; a NAS signaling parameter; an AS signaling parameter; an information regarding configuration for NTN deployment as configured in the UE; an information regarding configuration for NTN deployment as indicated by the network; an information regarding configuration for NTN deployment as configured in a SIM; an information regarding configuration for NTN deployment as indicated by a server; an information regarding configuration for NTN deployment as indicated by an application function; a database indicating details of a satellite or NTN cell, its location, its availability/unavailability time and its deployment details; an ML or an AI model to predict or determine a network availability and unavailability status; a data driven technique to predict or determine a network availability and unavailability status.

In an example embodiment, the voice support determination module 214 may be configured to perform either of operation 800-1 or operation 800-2. Operation 800-1 may be performed by the voice support determination module 214 prior to initiating a registration process for registering the UE 100 on the NTN 140. Operation 800-2 may be performed by the voice support determination module 214 after initiating the registration process for registering the UE 100 on the NTN 140.

Figure 9:
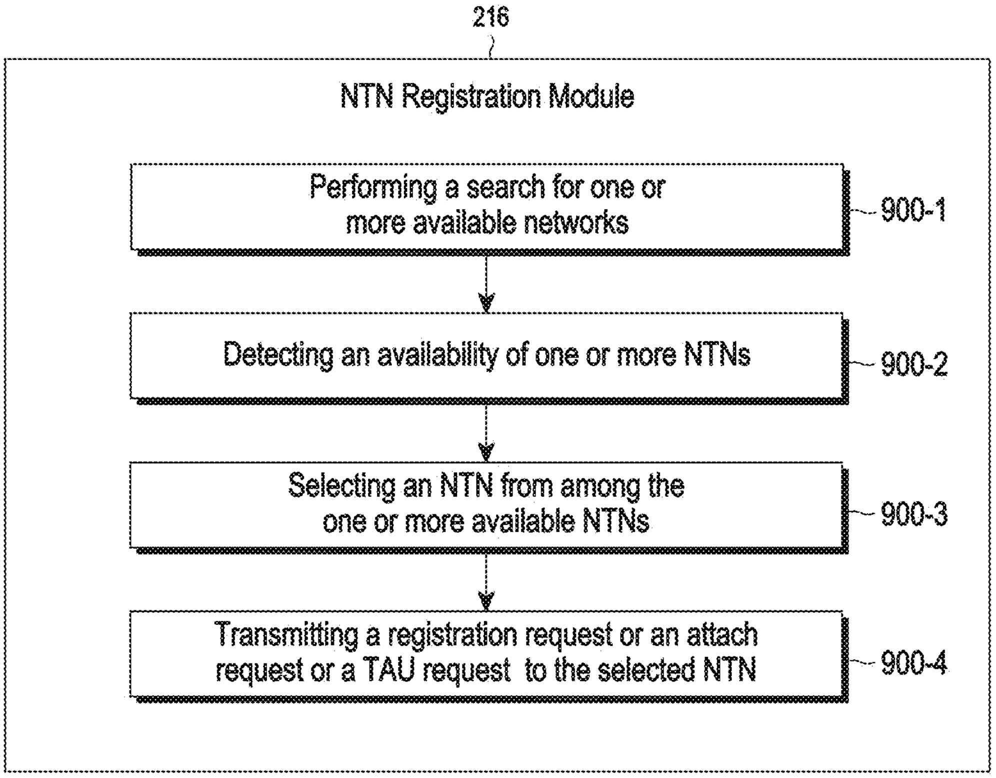
FIG. 9 illustrates a process flow for performing the NTN camping or registration process by the NTN registration module of the UE, in accordance with an example embodiment of the disclosure.

FIG. 9 illustrates a process flow for performing the NTN camping or registration process by the NTN registration module of the UE, in accordance with an example embodiment of the disclosure.

At operation 900-1, the NTN registration module 216 may be configured to perform a search for one or more available network(s).

At operation 900-2, the NTN registration module 216 may be configured to detect an availability of one or more NTN(s).

At operation 900-3, the NTN registration module 216 may be configured to select an NTN 140 from among one or more available NTNs.

At operation 900-4, the NTN registration module 216 may be configured to transmit a registration request or an attach request or a TAU request to the selected NTN 140.

In an example embodiment of the disclosure, the NTN registration module 216 may be configured to register the voice-centric UE 100 to an available NTN 140. The availability of the NTN 140 is determined by the NTN availability determination module 212. In an event that the voice-centric UE 100 determines the absence of voice-service support by the voice support determination module 214, the UE 100 may be configured to perform registration to an NTN 140 by using the NTN registration module 216. In the embodiment, the NTN registration module 216 performs operations 900-1, 900-2, 900-3 and 900-4 in a sequential manner one after the other. After completion of operation 900-4, the voice-centric UE 100 is successfully camped or registered to the available NTN in an event associated with the absence of voice-service support at a location.

Figure 10:
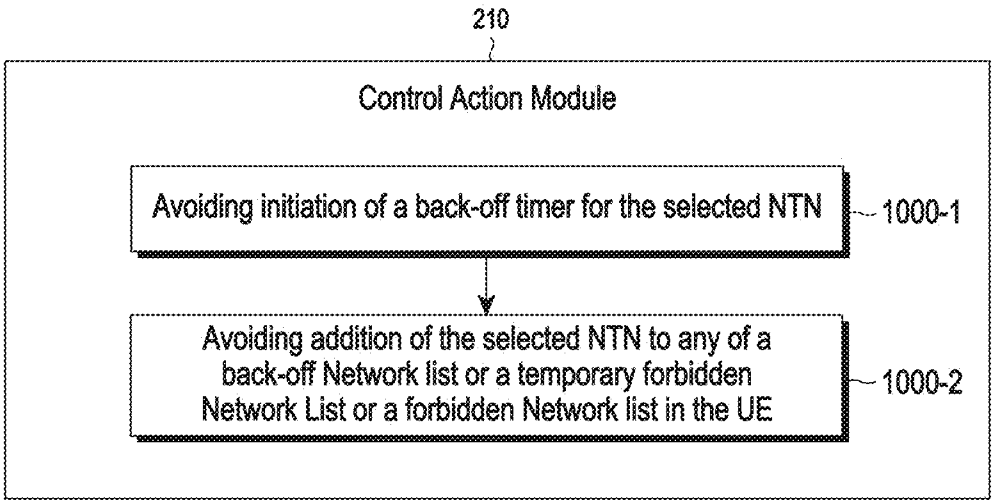
FIG. 10 illustrates the process flow corresponding to a first combination of control actions to be performed by the control action module of the UE, in accordance with a preferred example embodiment of the disclosure.

FIG. 10 illustrates the process flow corresponding to the first combination of control actions to be performed by the control action module of the UE, in accordance with a preferred example embodiment of the disclosure.

At operation 1000-1, the control action module 210 may be configured to avoid the initiation of a back-off timer (for example, with respect to an NTN PLMN associated with the selected/registered NTN) for the selected NTN 140.

At operation 1000-2, the control action module 210 may be configured to avoid the addition of the selected NTN 140 (for example, an NTN PLMN/cell associated with selected/registered NTN) to any of the back-off Network list or temporary forbidden network list or a forbidden Network List (for example, forbidden PLMN list) in the UE 100.

In an example embodiment of the disclosure associated with an event, a voice-centric UE 100 performs registration on an NTN 140 and gets SMS-only services/no voice services indication from the network. The control action module 210 may be configured to perform operation 1000-1 and avoid the initiation of any back-off timer or 3GPP timer for the registered PLMN or RAT or cell (i.e., NTN PLMN). The control action module 210 may be further configured in accordance with operation 1000-2 to avoid adding the registered PLMN or RAT (i.e., NTN PLMN) into any back-off/temporary forbidden PLMN list while performing a search for voice services in other cells or RAT. The UE 100 may be configured to remain camped/registered on the NTN PLMN for available NTN services (i.e., SMS only or other available services). In an example, the UE 100 may search for voice services over other NTN cells, if required, in the background while remaining camped on NTN PLMN/cell.

In the embodiment, the UE 100 does not have to start the back-off timer/add the registered PLMN to any back-off or temporary forbidden PLMN List. The UE 100 is further not required to de-register from the registered NTN PLMN/RAT and may be configured to remain camped to the NTN 140 in the event that there are no network cells available for voice services.

In the embodiment, the UE 100 does not start any back-off or 3GPP timer for the current registered NTN PLMN for searching alternate cells associated with voice services. The disclosure ensures saving battery resources wasted in scanning all RATs and associated bands/frequencies. Further, the device remains camped to the only available NTN 140 and thereby avoids unnecessary delay associated with the search for voice services.

Figure 11:
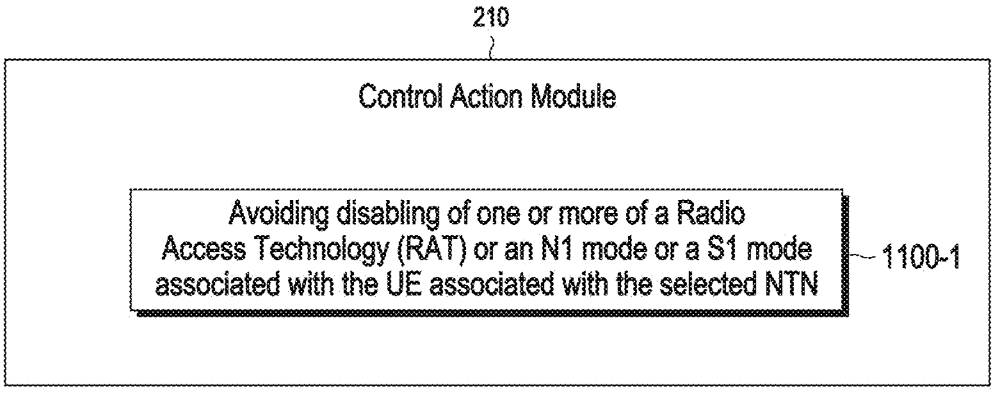
FIG. 11 illustrates the process flow corresponding to a second combination of control actions to be performed by the control action module of the UE, in accordance with a preferred example embodiment of the disclosure.

FIG. 11 illustrates the process flow corresponding to a second combination of control actions to be performed by the control action module of the UE, in accordance with a preferred example embodiment of the disclosure.

At operation 1100-1, the control action module 210 may be configured to avoid disabling one or more of a RAT or an N1 mode or a S1 mode associated with the UE 100 (for example, associated with respect to an NTN PLMN or NTN cell or to the selected/registered NTN (PLMN/Cell)) associated with the NTN 140 or an N1 mode or an S1 mode associated with the UE 100 (for example, for all the network (PLMN/Cell)).

In an example embodiment associated with an event where the "voice services not supported" indication is received from the NTN network by the voice-centric UE 100, the control action module 210 may be configured to perform the second combination of control actions. In the embodiment, the control action module 210 may be configured to avoid disabling the N1 mode or similarly S1 mode for LTE mode or any RAT mode) capabilities (NG-RAN mode) in a single registration mode. Further, the UE 100 remains registered to the NTN 140 with SMS-only service, or any other service provided by the NTN 140. Furthermore, the UE 100 is not required to disable NG-RAN or E-UTRAN capabilities and search for voice services in other RATs (for example, for the registered PLMN/Cell or for any PLMN/Cell). In the event associated with the reception of "voice services not supported" by the UE 100 from the network, there may be the absence of terrestrial and non-terrestrial network coverage available for voice services.

In the embodiment, the UE 100 is configured to prevent disabling and re-enabling N1 mode (or similarly S1 mode or any RAT mode) capabilities. As a result, the voice-centric UE 100 avoids the delay in camping and registering onto the NTN network. The present embodiment helps UE 100 to get faster and more stable NTN service access.

Figure 12:
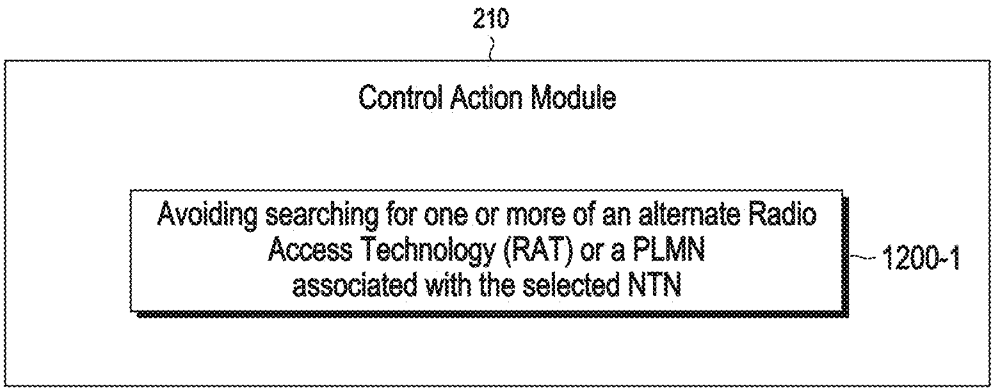
FIG. 12 illustrates the process flow corresponding to a third combination of control actions to be performed by the control action module of the UE, in accordance with a preferred example embodiment of the disclosure.

FIG. 12 illustrates the process flow corresponding to a third combination of control actions to be performed by the control action module of the UE, in accordance with a preferred example embodiment of the disclosure.

At operation 1200-1, the control action module 210 may be configured to avoid searching for or selecting one or more of an alternate RAT or a PLMN or a Cell associated with the selected NTN 140.

In an example embodiment of the disclosure associated with an event where the voice-centric UE 100 performs registration on the NTN 140 without IMS voice, the control action module 210 may be configured to perform the third combination of control actions. In the embodiment, the control action module 210 may be configured to avoid searching for or selecting an alternate RATs (such as TN system and NTN system) or an alternate cell for the registered PLMN and remain camped to the NTN 140 for the available services (i.e., SMS only or other services). The terrestrial networks have higher priority than the NTN network and a device camp to the NTN network only when there is the absence of terrestrial network coverage available. In the absence of terrestrial network coverage, the UE 100 searches for voice services in alternate RATs/Cells/PLMNs/Accesses/Networks (such as the TN system) may correspond to a redundant search. The present embodiment helps in avoiding the redundant search.

In the embodiment, the UE 100 is configured to avoid searching for or selecting an alternate cells/RATs/PLMNs/Accesses/Networks associated with voice services. The implementation of the embodiment saves battery resources used for scanning all RATs and associated bands/frequencies. Moreover, UE 100 will select only the available NTN 140 for camping, thereby reducing the delay in the time required for camping to the NTN network.

Figure 13:
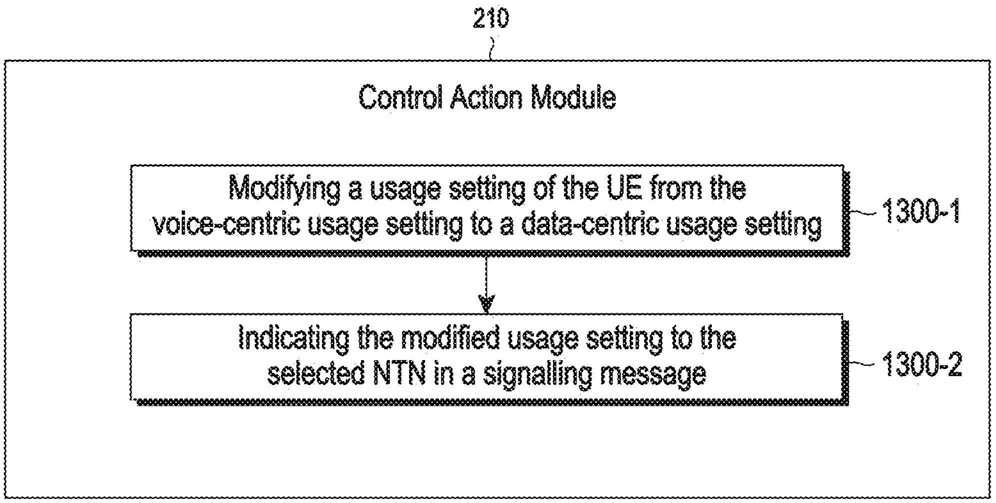
FIG. 13 illustrates the process flow corresponding to a fourth combination of control actions to be performed by the control action module of the UE, in accordance with a preferred example embodiment of the disclosure.

FIG. 13 illustrates the process flow corresponding to a fourth combination of control actions to be performed by the control action module of the UE, in accordance with a preferred example embodiment of the disclosure.

At operation 1300-1, the control action module 210 may be configured to modify a usage setting of the UE 100 from the voice-centric usage setting to a data-centric usage setting (for example, while being camped/registered or while registering/attaching on an NTN PLMN associated with the NTN 140).

At operation 1300-2, the control action module 210 may be configured to indicate the modified usage setting to the selected NTN 140 in a signaling message.

In an embodiment, the terms selected and registered are used interchangeably and have the same meaning.

In an example embodiment of the disclosure associated with an event where the voice-centric UE 100 performs registration on an NTN 140 not supporting voice services, the control action module 210 may be configured to perform the fourth combination of control actions. In the embodiment, the registration request is either accepted or rejected indicating the absence of support for voice services by the NTN 140. In such a scenario, the control action module 210 may be configured to modify the UE 100 usage setting to "data-centric" temporarily and remain camped onto the NTN 140 for the available services.

Further, in the embodiment, the control action module 210 may be configured to indicate the change in the usage setting. The UE 100 via control action module 210 may indicate to the network by means of signaling messages such as registration requests with mobility registration updates or a TAU request message. Additionally, the control action module 210 may indicate to the network by initiating a DETACH or a deregistration (with optionally a re-attach or a re-registration required) followed by a registration/attach/TAU procedure with a modified UE 100 usage setting. Further, once the UE 100 detects an available terrestrial network, the UE 100 is configured to revert its setting back to voice-centric.

In the embodiment, the UE 100 is configured to remain camped to the NTN 140 for the available services regardless of IMS voice service availability. The implementation of the embodiment avoids unnecessary search for voice services in other cells/RATs and the UE 100 experiences faster NTN services.

Figure 14:
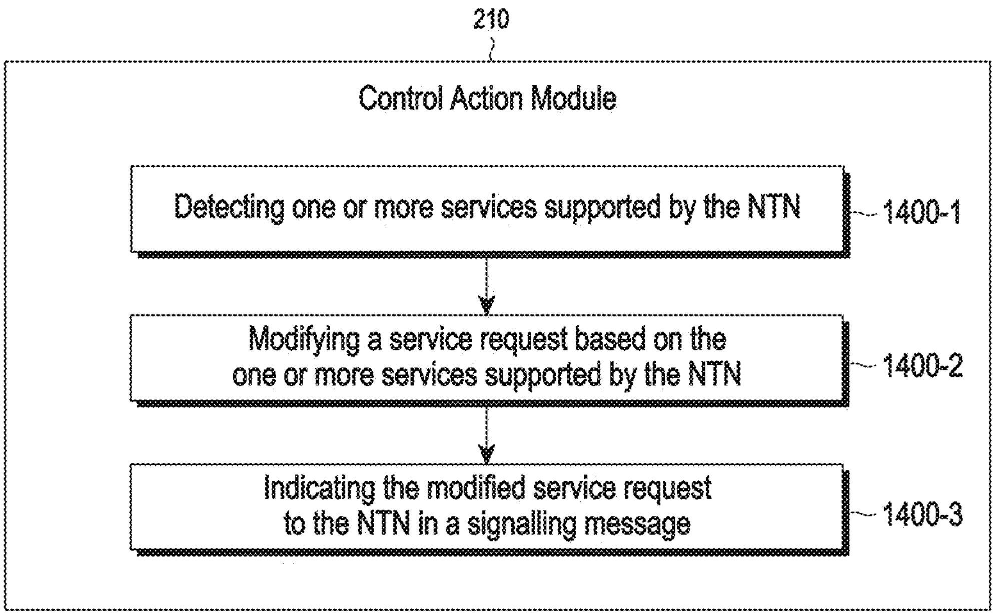
FIG. 14 illustrates the process flow corresponding to a fifth combination of control actions to be performed by the control action module of the UE, in accordance with a preferred example embodiment of the disclosure.

FIG. 14 illustrates the process flow corresponding to a fifth combination of control actions to be performed by the control action module of the UE, in accordance with a preferred example embodiment of the disclosure.

At operation 1400-1, the control action module 210 may be configured to detect one or more services supported by the NTN.

At operation 1400-2, the control action module 210 may be configured to modify a service request based on the one or more services supported by the NTN 140 (for example, while being camped/registered or while registering/attaching on an NTN PLMN associated with the NTN 140).

At operation 1400-3, the control action module 210 may be configured to indicate the modified service request to the NTN in an AS or NAS signaling message.

In an example embodiment of the disclosure associated with an event where the voice-centric UE 100 performs registration on an NTN 140 not supporting voice service, the control action module 210 may be configured to perform the fifth combination of control actions. In the example embodiment, the registration request is accepted or rejected by the NTN 140. The rejection of registration requests corresponds to the absence of voice services support by the NTN 140. In such a scenario, the control action module 210 may be configured to trigger re-registration/re-attach/TAU or trigger a deregistration or a DETACH (with optionally re-attach or a re-registration required) followed by a registration/attach/TAU procedure.

During the registration procedure, the control action module 210 may be configured to register for 5GS-only services (i.e., PS-only services without any request for voice services.). The control action module 210 may be further configured to indicate the SMS-only requested bit to "SMS only" in the additional update type IE. In an example, the one or more services supported by the NTN system may correspond to "SMS only" or data-centric services. In the example, the modified service request is based on the service supported by the NTN system (such as "SMS only" services).

In the embodiment, the UE 100 is configured to request SMS-only services (or any other services except voice services), therefore the UE 100 remains camped to the NTN network without any avoidable delay. In the embodiment, the UE 100 performs registration only for SMS services (or other services except voice services) and the UE 100 remains camped to the NTN 140 for the available services without any delay. The delay may be associated with the disabling of N1 mode capabilities as per 3GPP specification during such a scenario. The implementation of the embodiment avoids the search for voice services in other cells/RATs that are not available in the NTN-only coverage area. Further, the UE 100 receives faster NTN services in NTN coverage locations through the implementation of the embodiment.

Figure 15:
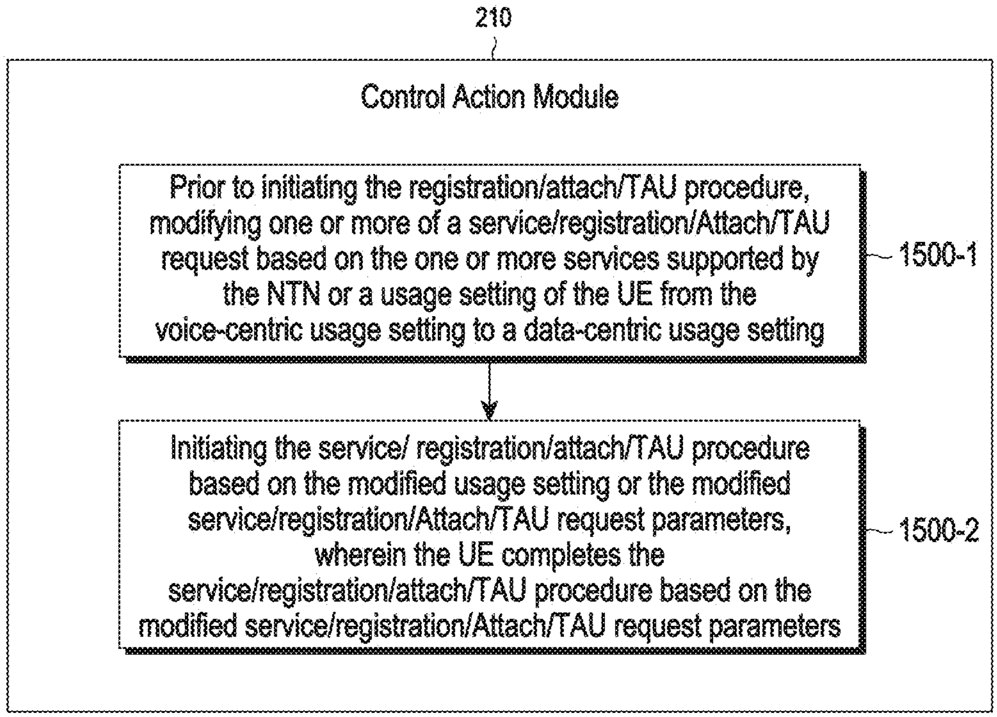
FIG. 15 illustrates the process flow corresponding to a sixth combination of control actions to be performed by the control action module of the UE, in accordance with a preferred example embodiment of the disclosure.

FIG. 15 illustrates the process flow corresponding to a sixth combination of control actions to be performed by the control action module of the UE 100, in accordance with a preferred example embodiment of the disclosure.

At operation 1500-1, the control action module 210 may be configured to modify, prior to initiating the registration/attach/TAU procedure, one or more of a service/registration/attach/TAU request based on the one or more services supported by the NTN or a usage setting of the UE 100 from the voice-centric usage setting to a data-centric usage setting.

At operation 1500-2, the control action module 210 may be configured to initiate the service/registration/attach/TAU procedure based on the modified usage setting or the modified registration/attach/TAU request parameters, wherein the UE 100 completes the service/registration/attach/TAU procedure based on the modified service/registration/attach/TAU request parameters.

In an example embodiment of the disclosure associated with an event where the voice-centric UE 100 is configured to predict the available NTN 140 will not support voice services. The prediction related to the absence of voice service support by available NTN may be based on pre-determined factors such as agreement among the operator, NTN provider, and the UE 100. The factors may further include operator deployment/agreement or any configuration/pre-configuration. The factors may furthermore include any previous camping database. The prediction related to the absence of voice service support by available NTN may be performed using AI/ML techniques.

In an exemplary scenario in accordance with the embodiment, the one or more services supported by the NTN may include "SMS only" and data-centric services. Further, the control action module 210 may be configured to register with SMS-only services during initial/first/mobility registration with NTN RAT/PLMN. Additionally, the modified usage setting or the modified registration request parameters may correspond to the "SMS only" and data-centric services. Furthermore, the control action module 210 may be configured to set the registration type to 5GS only and further set the UE 100 usage setting to "data-centric" during initial/first registration on the NTN RAT/PLMN.

The implementation avoids the problem of delay or re-registration. In the embodiment, the UE 100 performs registration only for SMS services during the initial registration. The implementation of the embodiment avoids delay associated with alternate cell search for voice service as defined in the 3GPP specification. Further, the UE 100 avoids performing re-registration and quickly acquires stable NTN services.

Figure 16:
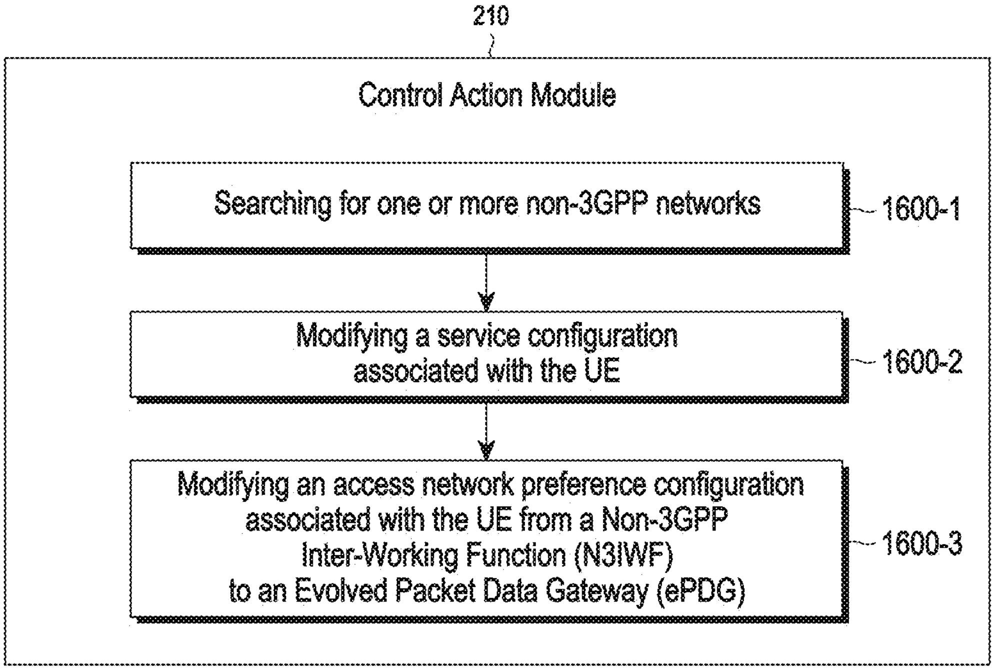
FIG. 16 illustrates the process flow corresponding to a seventh combination of control actions to be performed by the control action module of the UE, in accordance with a preferred example embodiment of the disclosure.

FIG. 16 illustrates the process flow corresponding to a seventh combination of control actions to be performed by the control action module of the UE, in accordance with a preferred example embodiment of the disclosure.

At operation 1600-1, the control action module 210 may be configured to search for one or more non-3GPP networks.

At operation 1600-2, the control action module 210 may be configured to modify a service configuration associated with the UE 100.

At operation 1600-3, the control action module 210 may be configured to modify an access network preference configuration associated with the UE 100 from a N3IWF to an ePDG.

In an example embodiment associated with an optimized solution associated with services from non-3GPP networks. After performing operation 1600-1, the UE 100 may remain registered for NTN services with available services (such as SMS-only services/no voice service). Further, the control action module 210 may be configured to concurrently perform a search for non-3GPP in an event where voice services are available for non-3GPP access (like voice over Wi-Fi). Further, while searching for non-3GPP access, the control action module 210 may be configured to set the preference to use/prefer ePDG over N3IWF in a scenario where both ePDG and N3IWF are available. The ePDG is preferred over N3IWF as N3IWF is configured to connect to 3GPP networks. Further, in the embodiment, the voice services are not available over 3GPP NTN Networks. Therefore, the connection to ePDG is preferred over N3IWF, in a scenario where both ePDG and N3IWF are available. Furthermore, the control action module 210 may be configured to change the preference to ePDG in the event the preference at the UE 100 is already set to use N3IWF.

Figure 16A:
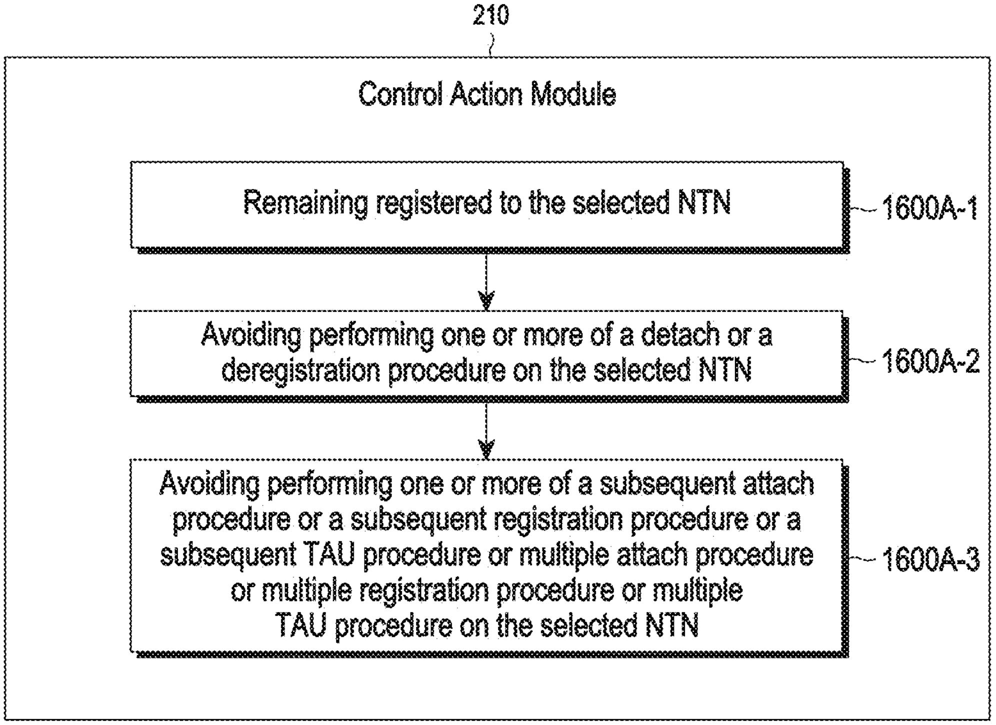
FIG. 16A illustrates the process flow corresponding to a first alternate combination of control actions to be performed by the control action module of the UE, in accordance with a preferred example embodiment of the disclosure.

FIG. 16A illustrates the process flow corresponding to a first alternate combination of control actions to be performed by the control action module of the UE, in accordance with a preferred example embodiment of the disclosure.

At operation 1600A-1, the control action module 210 may be configured to keep the UE 100 registered or camped or attached to the selected NTN 140.

At operation 1600A-2, the control action module 210 may be configured to avoid performing one or more of a detach or a deregistration procedure on the selected NTN 140.

At operation 1600A-3, the control action module 210 may be configured to avoid performing one or more of a subsequent attach procedure or a subsequent registration procedure or a subsequent TAU procedure or multiple attach procedure or multiple registration procedure or multiple TAU procedure on the selected NTN 140.

In an example embodiment of the disclosure associated with an event, a voice-centric UE 100 performs registration on an NTN 140 and gets SMS-only services/no voice services indication from the network. The control action module 210 may be configured to perform operation 1600A-1 and keep the UE 100 registered or camped or attached to the selected/registered NTN 140. In an embodiment, the UE shall stay camped or registered on a cell or a PLMN (for example, NTN) with the Attach/Registration configuration received from the Network indicating that the UE is registered/attached for SMS services only and there is no voice services available (for example, VoPS is set to false or zero) and there is no emergency bearer services support (for example, EMC is set to false or zero).

The control action module 210 may be further configured in accordance with operation 1600A-2 to avoid performing one or more of a detach or a deregistration procedure on the selected NTN 140. The control action module 210 may be further configured in accordance with operation 1600A-3 to avoid performing one or more of a subsequent attach procedure or a subsequent registration procedure or a subsequent TAU procedure or multiple attach procedure or multiple registration procedure or multiple TAU procedure on the selected NTN 140.

In an embodiment, when a voice centric UE 100 performs attach/registration on an NTN 140 and during registration/attach/TAU procedure, gets SMS-only services from Network (for example, attach type as SMS only or combined IMSI with SMS only or an indication that the SMS only requested bit is set to "SMS only" in the additional update type IE) and/or gets no voice services indication from the network (for example, VoPS is set to false or zero) and/or there is no emergency bearer services support (for example, EMC is set to false or zero), the UE 100 shall not perform or execute a detach or a deregistration procedure or a subsequent attach or a TAU procedure or a registration procedure. The UE 100 shall not perform multiple attach or registration or TAU attempts on the selected/registered NTN. The UE shall remain camped or registered on the selected/registered NTN (for example, Cell/PLMN) with the received attach/registration/TAU configuration parameters.

Figure 16B:
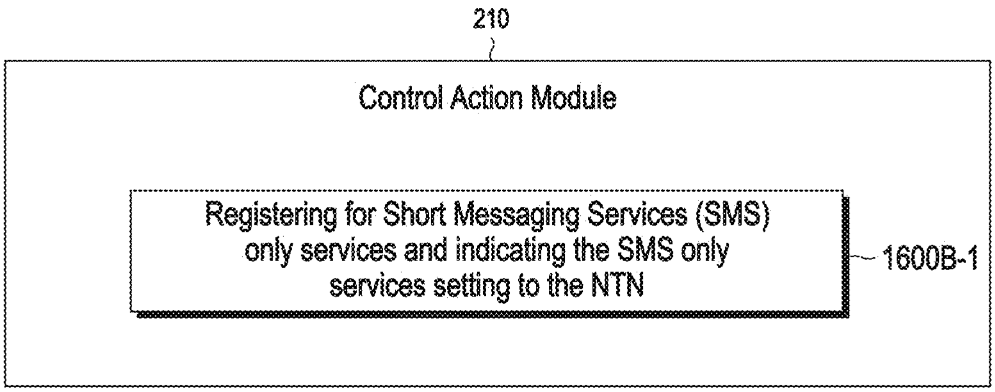
FIG. 16B illustrates the process flow corresponding to a second alternate combination of control actions to be performed by the control action module of the UE, in accordance with a preferred example embodiment of the disclosure.

FIG. 16B illustrates the process flow corresponding to a second alternate combination of control actions to be performed by the control action module of the UE, in accordance with a preferred example embodiment of the disclosure.

At operation 1600B-1, the control action module 210 may be configured to register for SMS only services and indicating the SMS only services setting to the NTN 140.

In an example embodiment of the disclosure associated with an event where the voice-centric UE 100 performs registration on an NTN 140 not supporting voice services, the control action module 210 may be configured to perform second alternate combination of control actions. In the example embodiment, the UE 100 may register/attach to the NTN (for example, NTN Cell or NTN PLMN) for SMS only services and may indicate to the network the support for SMS only services by indicating the SMS only requested bit to "SMS only" in the additional update type IE or using any bit or IE in the registration/attach/TAU request message or any other AS or NAS signaling message.

Figure 16C:
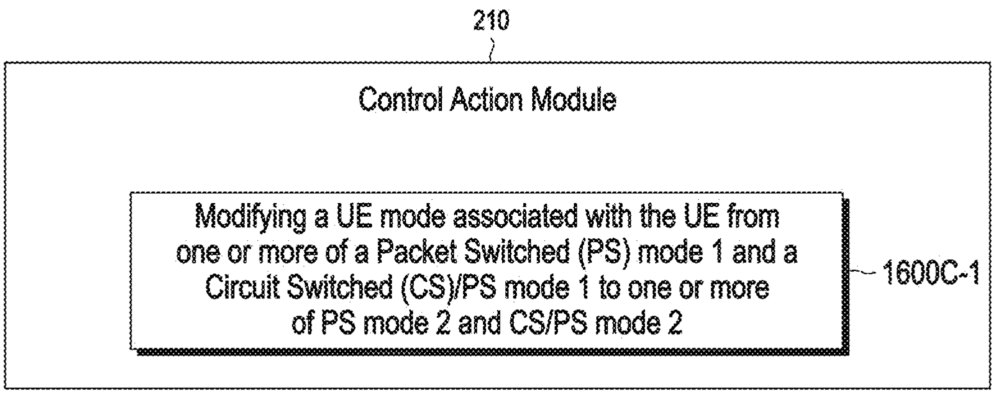
FIG. 16C illustrates the process flow corresponding to a third alternate combination of control actions to be performed by the control action module of the UE, in accordance with a preferred example embodiment of the disclosure.

FIG. 16C illustrates the process flow corresponding to a third alternate combination of control actions to be performed by the control action module of the UE, in accordance with a preferred example embodiment of the disclosure.

At operation 1600C-1, the control action module 210 may be configured to modify a UE mode associated with the UE from one or more of a PS mode 1 and a CS/PS mode 1 to one or more of PS mode 2 and CS/PS mode 2.

Figure 16D:
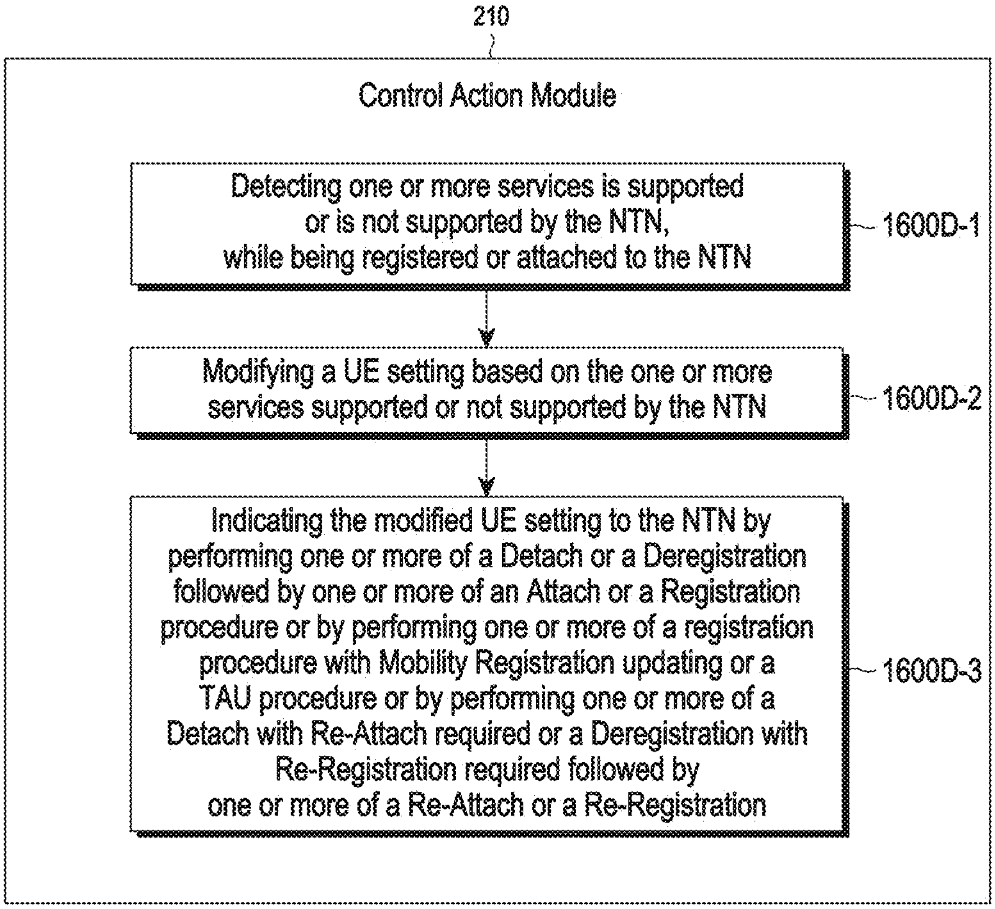
FIG. 16D illustrates the process flow corresponding to a fourth alternate combination of control actions to be performed by the control action module of the UE, in accordance with a preferred example embodiment of the disclosure.

FIG. 16D illustrates the process flow corresponding to a fourth alternate combination of control actions to be performed by the control action module of the UE, in accordance with a preferred example embodiment of the disclosure.

At operation 1600D-1, the control action module 210 may be configured to detect one or more services is supported or is not supported by the NTN 140, while being registered or attached to the NTN 140.

The control action module 210 may be further configured in accordance with operation 1600D-2 to modify a UE setting based on the one or more services supported or not supported by the NTN 140.

The control action module 210 may be further configured in accordance with operation 1600D-3 to indicate the modified UE setting to the NTN by performing one or more of a Detach or a Deregistration followed by one or more of an Attach or a Registration procedure or by performing one or more of a registration procedure with mobility registration updating or a TAU procedure or by performing one or more of a detach with re-Attach required or a deregistration with re-registration required followed by one or more of a Re-Attach or a Re-Registration.

Figure 17A:
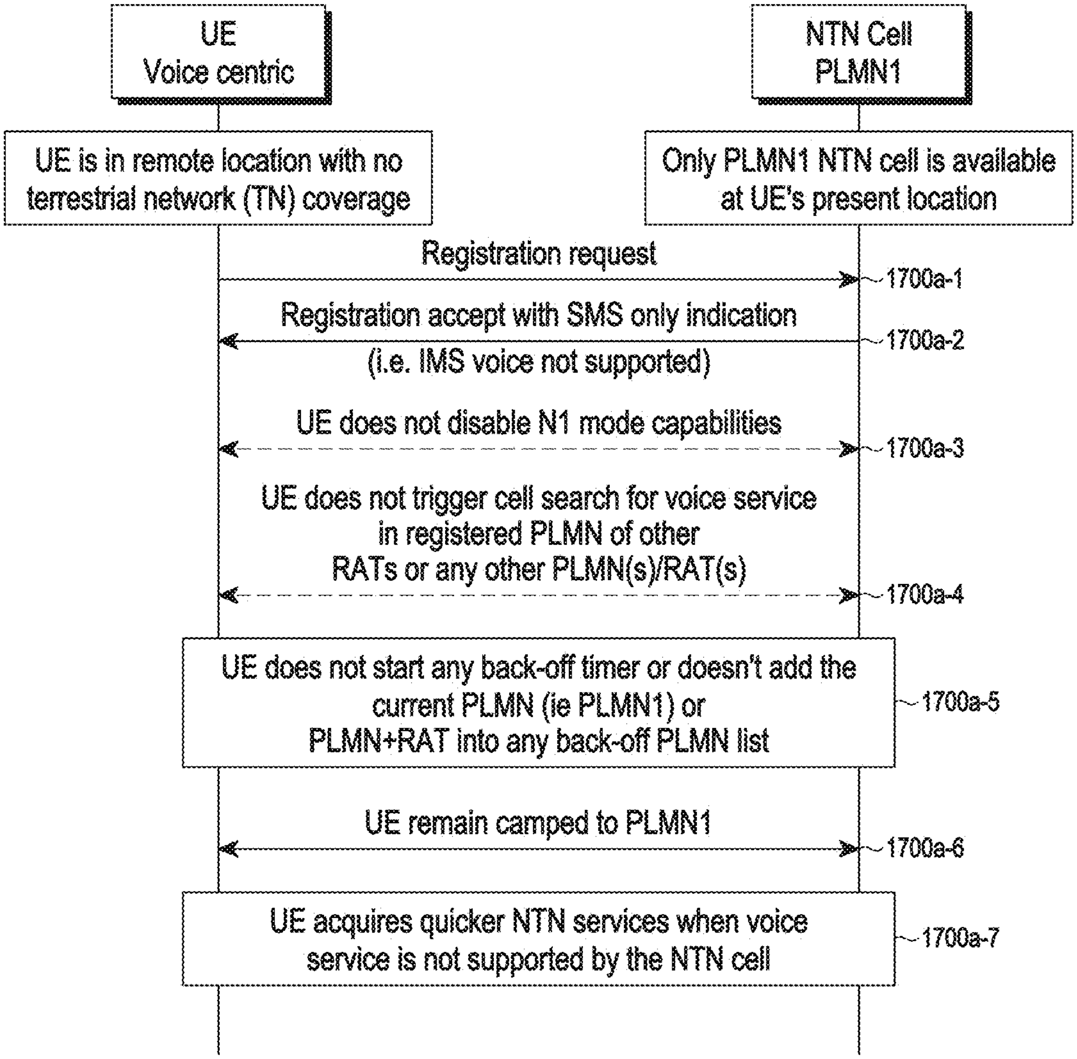
FIG. 17A illustrates a sequence flow diagram in an exemplary use case based on a solution relying on the combination of first, second, and third combination of control actions, in accordance with an example embodiment of the disclosure.

FIG. 17A illustrates a sequence flow diagram in an exemplary use case based on a solution relying on the combination of first, second, and third combination of control actions, in accordance with an example embodiment of the disclosure.

Figure 17B:
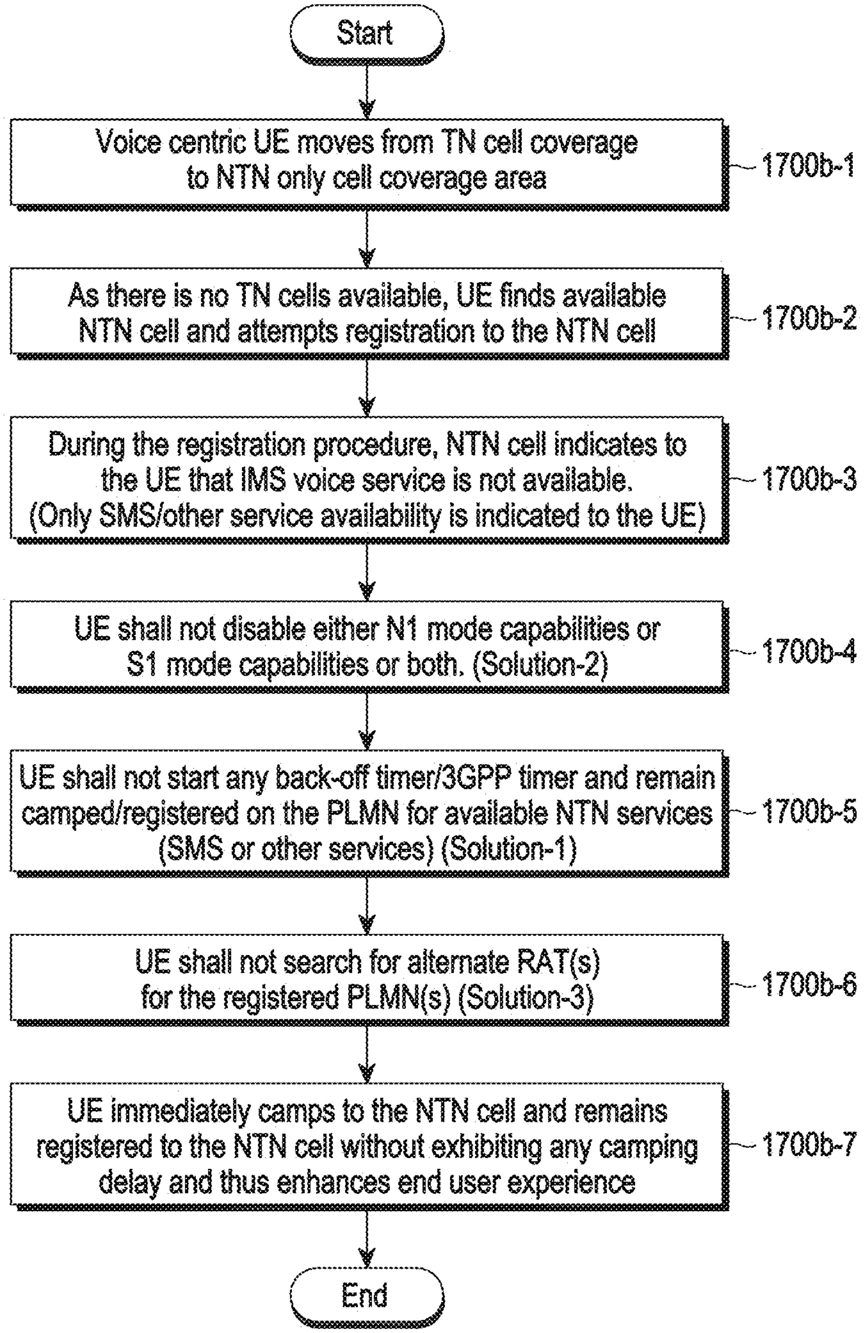
FIG. 17B illustrates a flow diagram illustrating an exemplary use case based on a solution relying on the combination of first, second, and third combination of control actions, in accordance with an example embodiment of the disclosure.

FIG. 17B illustrates a flow diagram illustrating an exemplary use case based on a solution relying on the combination of first, second and third combination of control actions, in accordance with an example embodiment of the disclosure. FIG. 17A and FIG. 17B are associated with the same use case and are explained together for the sake of clarity.

In an exemplary use-case scenario of the solution provided in the disclosure, a combination of the first, second, and third combination of control actions may be used to acquire NTN services by a voice-centric UE 100 when voice services are not supported by the available NTN 140. In the FIG. 17A, the sequence flow diagram illustrates the signals transmitted between the voice-centric UE and NTN PLMN1 in operations 1700*a*-1 to 1700*a*-7.

In the use-case scenario, a voice-centric UE 100 present in the NTN only coverage area attempts registration/attach/TAU on an NTN 140 that does not support IMS voice services. The NTN 140 either accepts or rejects the registration/attach/TAU request indicating that voice services are not supported by the NTN 140. During this scenario, as per 3GPP specification 24.501 or 24.301, the UE 100 needs to disable N1 mode (or similarly S1 mode or any RAT mode) capabilities and search for or select voice services in other RATs/Cells/Accesses on the registered PLMN or equivalent PLMNs or on any RAT/PLMN/Cell/Access combination. However, in the present scenario, the UE 100 is unable to find voice services in alternate RATs/Cells/PLMNs/Networks, since UE 100 is present in NTN only coverage area. With a combination of the proposed solution in accordance with the disclosure, the UE 100 relies on the combination of the first, second, and third combination of control actions. The UE 100 is configured to avoid starting any back-off timer/3GPP timer. The UE 100 is further configured to avoid adding the registered PLMN/Cell (or PLMN+NTN RAT+Cell) into any back-off PLMN list or any temporary forbidden PLMN/Cell list and remain camped/registered on the PLMN/Cell/RAT for available NTN services (in accordance with the first combination of control action explained with FIG. 10).

The UE 100 is further configured to avoid disabling N1 Mode (or similarly S1 mode for LTE or any RAT mode) capabilities (NG-RAN mode capabilities) and continue to remain camped to the NTN 140 (in accordance with the second combination of control action explained with FIG. 11).

The UE 100 is further configured to avoid searching for or selecting any alternate RAT(s)/Cells for the registered PLMN(s) or any alternate RAT(s) or PLMN(s) (in accordance with the third combination of control action explained with FIG. 12). As a result, the voice-centric UE 100 quickly acquires stable NTN services. In the exemplary use case by relying on the first, second, and third combination of control action, the voice-centric UE 100 avoids unnecessary cell/PLMN selection or search associated with battery power consumption at the UE 100.

As illustrated in FIG. 17B, at operation 1700*b*-1, the UE 100 moves from the TN cell coverage to the NTN-only cell coverage area.

At operation 1700*b*-2, as there are no TN cells available, the UE 100 finds available NTN 140 and attempts registration to the NTN 140. Next, at operation 1700*b*-3, during the registration/attach/TAU procedure, the NTN 140 indicates to the UE 100 that the IMS voice service support is not available and only SMS/other service availability is indicated to the UE 100.

At operation 1700*b*-4, the UE 100 may not disable either N1 mode capabilities or S1 mode capabilities or both, as per the second combination of control actions. At operation 1700*b*-5, the UE 100 may not start any back-off timer/3GPP timer, does not add the registered PLMN (or PLMN+NTN RAT) into any back-off PLMN/Cell list or any temporary forbidden PLMN/Cell List, and remain camped/registered on the PLMN for available NTN services, as per first combination of control actions. At operation 1700*b*-6, the UE 100 may not search for any alternate RAT(s) for the registered PLMN(s) or any alternate RAT(s) or PLMN(s), as per the third combination of control actions.

Thereafter, at operation 1700*b*-7, the UE 100 immediately camps to the NTN 140 and remains registered to the NTN 140 without exhibiting any camping delay. As a result, the voice-centric UE 100 quickly acquires stable NTN services.

Figure 18A:
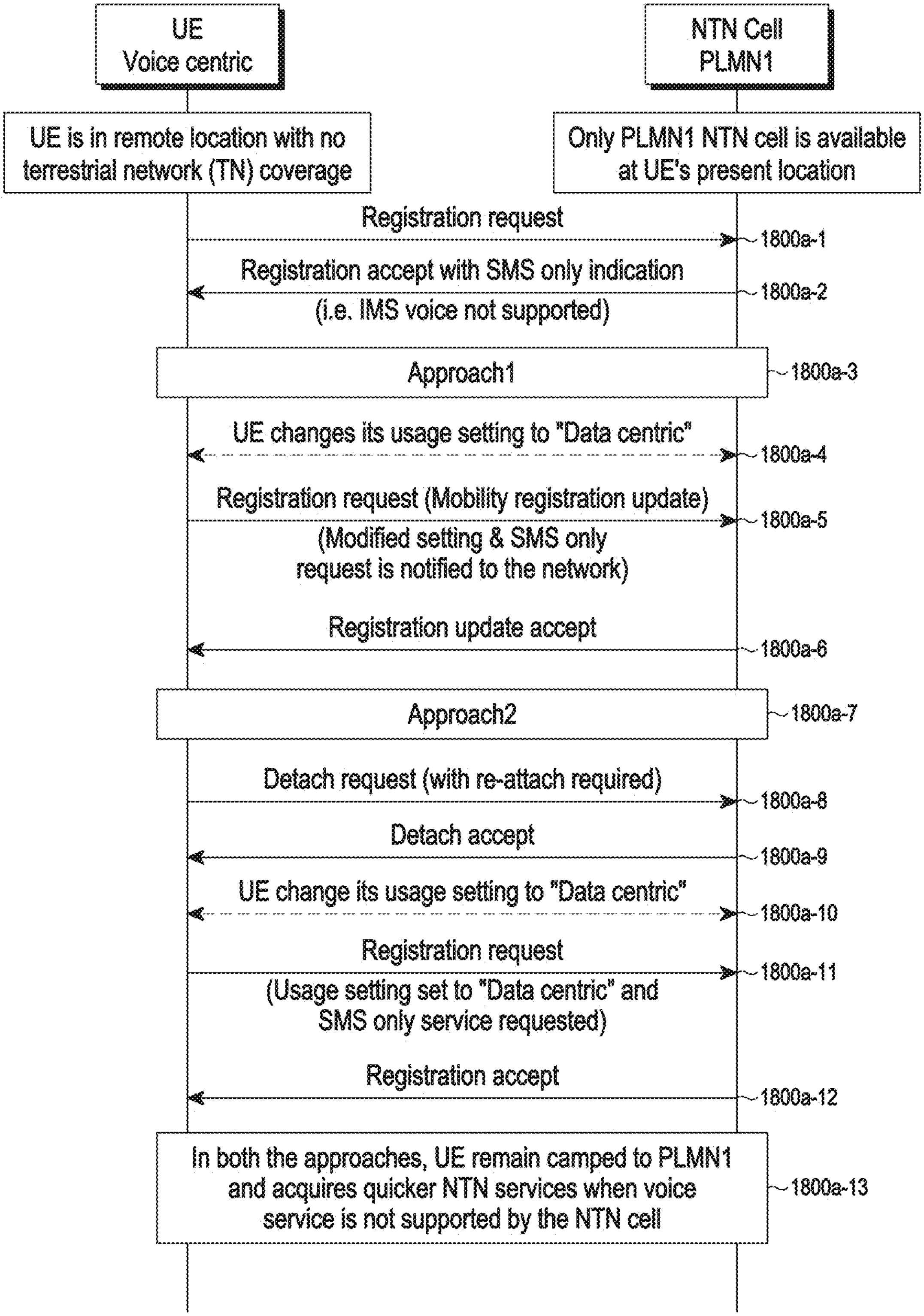
FIG. 18A illustrates a sequence flow diagram in an exemplary use case based on a solution relying on the combination of fourth and fifth combination of control actions, in accordance with an example embodiment of the disclosure.

FIG. 18A illustrates a sequence flow diagram in an exemplary use case based on a solution relying on the combination of fourth and fifth combination of control actions, in accordance with an example embodiment of the disclosure.

Figure 18B:
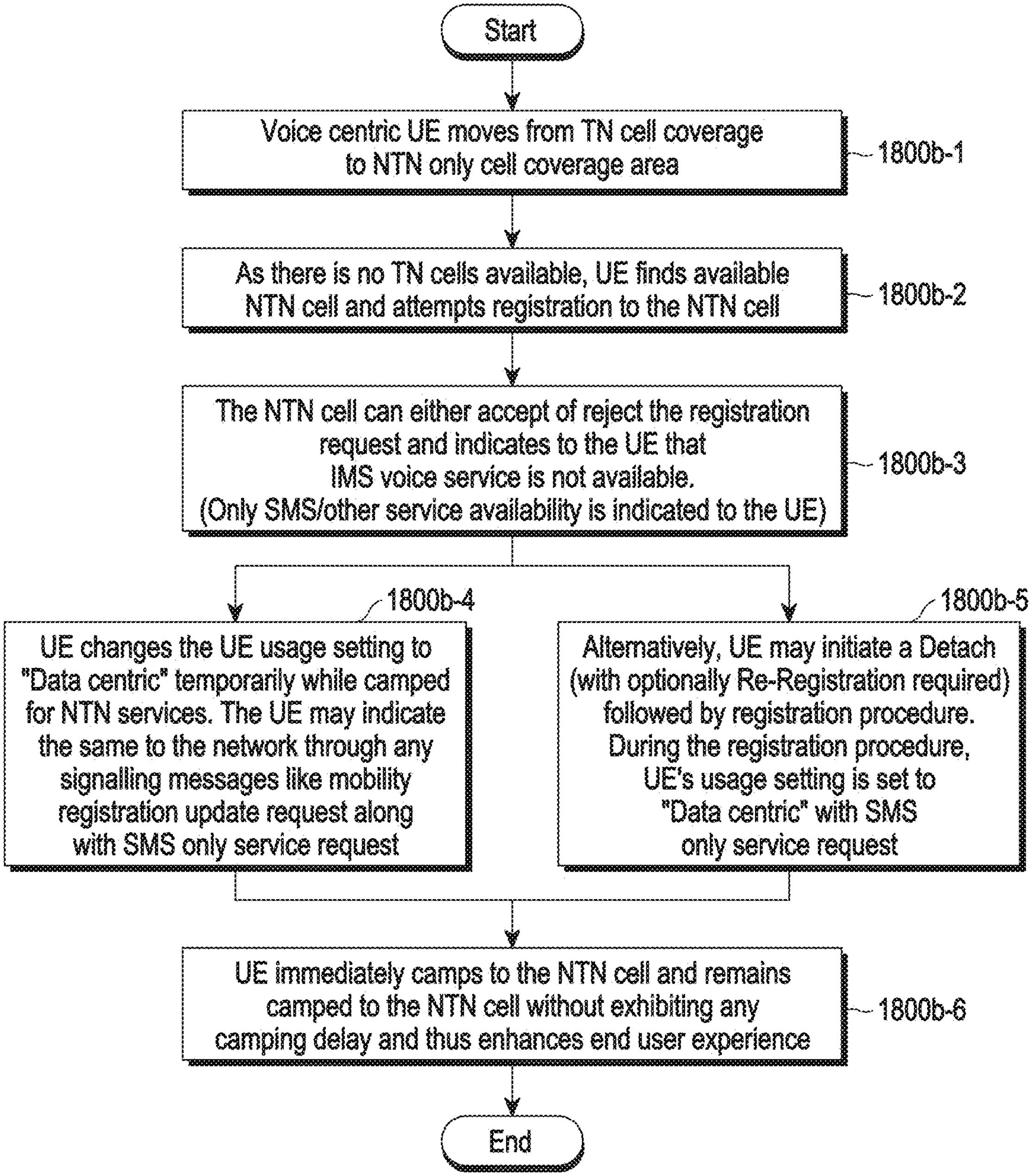
FIG. 18B illustrates a flow diagram illustrating an exemplary use-case based on a solution relying on the combination of fourth and fifth combination of control actions, in accordance with an example embodiment of the disclosure.

FIG. 18B illustrates a flow diagram illustrating an exemplary use case based on a solution relying on the combination of fourth and fifth combination of control actions, in accordance with an example embodiment of the disclosure. FIG. 18A and FIG. 18B are associated with the same use case and are explained together for the sake of clarity.

In an exemplary use-case scenario of the solution provided in the disclosure, a combination of the fourth and fifth combination of control actions may be used to acquire NTN services by a voice-centric UE 100 when voice services are not supported by the available NTN 140. In FIG. 18A, the sequence flow diagram illustrates the signals transmitted between the voice-centric UE and NTN PLMN1 in operations 1800*a*-1 to 1800*a*-13.

In the use-case scenario a voice centric UE 100 the NTN network accepts or rejects the registration/attach/TAU request by a voice centric UE 100 in NTN only coverage area. The NTN network provides an indication that only SMS services are supported by the NTN network. As illustrated in FIG. 18 the UE 100 follows the proposed solution based on the third and fourth combination of control actions.

In the use-case, the UE 100 modifies its usage setting temporarily to "Data Centric" while the UE 100 is camped/registered to NTN network not supporting voice services. In an event associated with updating the modified usage setting to the NTN network via signaling messages (like mobility registration request or update or any NAS signaling), the UE 100 may provide additional indication to the NTN network. In the additional indication the UE 100 indicates to the NTN network that UE 100 requires only available services such as SMS services (by indicating the SMS only requested bit to "SMS only" in the additional update type IE in the registration procedure).

The approach as provided in FIG. 18A and FIG. 18B enables UE 100 to avoid unnecessary disabling and re-enabling of N1 mode capabilities. Further, the search for voice services in alternate RATs or PLMN(s) is also avoided. As in the use-case the UE 100 is in an NTN only coverage area, the UE 100 will not be able to find any terrestrial network with voice services. The implementation of the solution illustrated in the present use-case scenario helps UE 100 to remain camped to the NTN 140 thereby facilitating faster acquisition of stable NTN services.

In the use-case scenario, depending on whether the NTN network accepts or rejects the registration/attach/TAU request of the UE 100, two situations may arise. In the first situation the NTN network accepts the registration request of the UE 100 with SMS only service indication. In this case the UE 100 may modify its usage setting to "Data Centric" and perform mobility registration update with SMS service only request indication. Alternatively, the UE 100 may also perform UE 100 initiated detach procedure followed by re-registration procedure with modified settings. As a result, the NTN network accepts the modified request from the UE 100, and the UE 100 remains camped to the NTN 140 for the available services.

Further, in the second situation, the NTN network rejects the registration request of a voice centric UE 100 indicating that IMS Voice services are not supported by the NTN network. In this case the UE 100 modifies its usage setting to "Data Centric" and perform re-registration procedure to the same NTN 140. During the re-registration procedure, the UE 100 requests only for SMS services. The request for SMS only services may be made by setting the SMS only requested bit to "SMS only" in the additional update type IE during the registration procedure.

As illustrated in FIG. 18B, at operation 1800*b*-1 the voice centric UE 100 moves from TN cell coverage to the NTN only cell coverage area. At operation 1800*b*-2, in the absence of TN cell, the UE 100 finds available NTN 140 and attempts registration to the NTN 140. At operation 1800*b*-3, the NTN 140 may either accept or reject the registration request and indicates to the UE 100 that IMS Voice service is not available and only SMS/other service availability is indicated to the UE 100.

At operation **1800*b*-4, the UE 100 may change the UE 100 usage setting to "Data Centric" temporarily while camped for NTN services. The UE 100 may indicate the same to the network through any signaling messages like mobile registration update request along with SMS only service request (in accordance with the fourth combination of control action explained with FIG. 13**).

Alternatively, at operation **1800*b*-5, the UE 100 may include a DETACH (with optionally re-registration required) followed by registration procedure. During the registration procedure, a UE's usage setting is set to "Data Centric" with SMS only service request (in accordance with the fifth combination of control action explained with FIG. 14**).

Thereafter, at operation **1800*b*-6, the UE 100 immediately camps to the NTN 140 and remains camped to the NTN 140** without exhibiting any camping delay and thus enhances end user experience.

Figure 19:
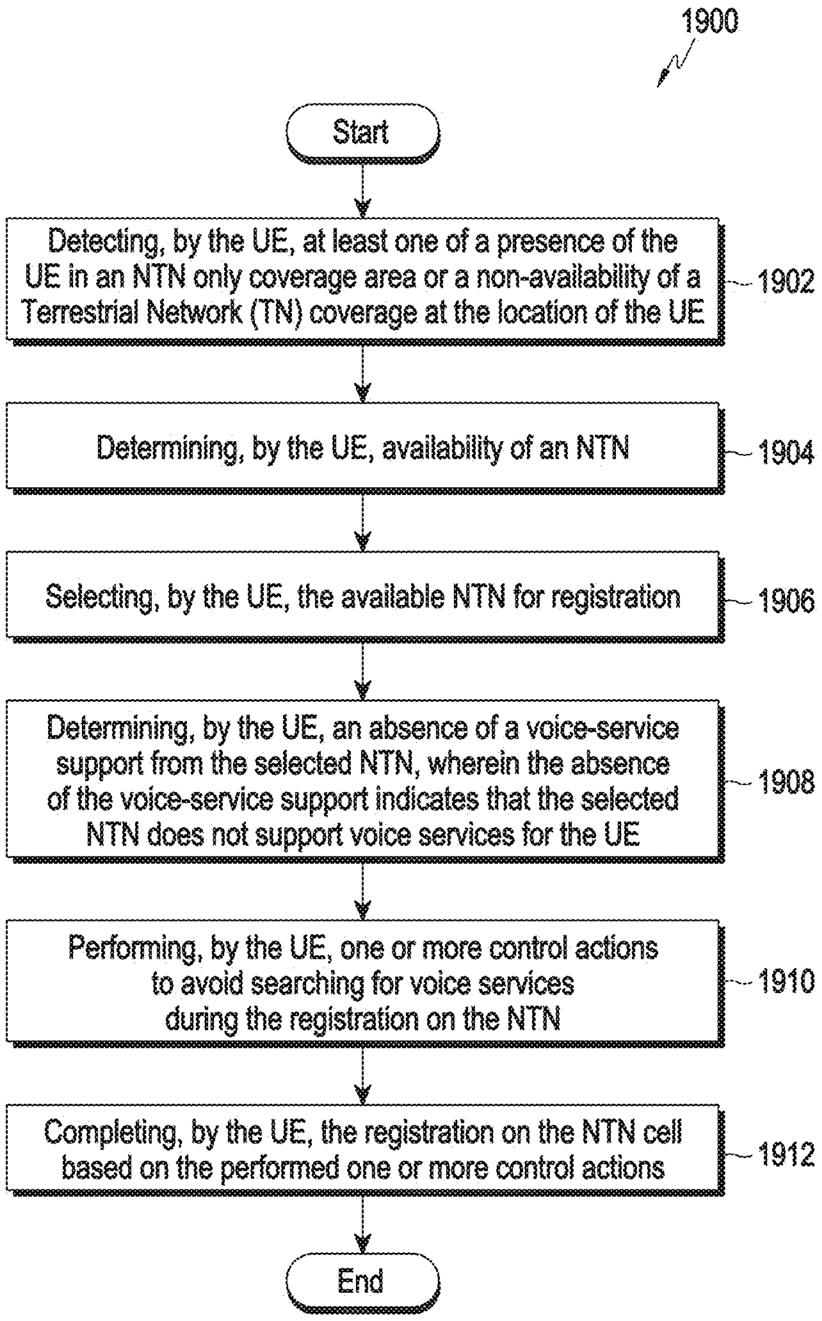
FIG. 19 illustrates an example process flow comprising a method for handling a NTN connection by a UE, in accordance with an example embodiment of the disclosure.

FIG. 19 illustrates an example process flow comprising a method for handling a NTN connection by a UE, in accordance with an example embodiment of the disclosure. The method 1900 may be a computer-implemented method executed, for example, by the UE 100, the processor 120, and the modules 122. For the sake of brevity, the constructional and operational features of the disclosure and the UE 100 that are already explained in the description of FIGS. 1 to 16, FIG. 17A, FIG. 17B, FIG. 18A, FIG. 18B are not explained in detail in the description of FIG. 19.

At operation 1902, the method 1900 may include detecting, by the UE 100, at least one of a presence of the UE 100 in an NTN only coverage area or a non-availability of a TN coverage at the location of the UE. In an embodiment, there may be terrestrial network(s) available in those area, but those Terrestrial Network may not be suitable or allowable for the UE (for example, those terrestrial network may not have any partnership with the network operator or HPLMN of the UE and may not provide normal services to the UE) for getting normal services (for example, UE may not be able to get normal services (for example, full set of services such as voice, data, SMS etc.) from those terrestrial network. Those terrestrial networks may be a part of a forbidden list present in the UE). The UE may assume that the UE is in a location where TN coverage is not available and only NTN coverage may be available in the location which may provide normal service to the UE (for example, normal service with only SMS or data etc.). The NTN may be deployed by the HPLMN or any of the partner network of the network operator/HPLMN of the UE.

At operation 1904, the method 1900 may include determining, by the UE 100, availability of an NTN 140.

At operation 1906, the method 1900 may include selecting, by the UE 100, the available NTN 140 for registration.

At operation 1908, the method 1900 may include determining, by the UE 100, an absence of a voice-service support from the selected NTN 140, wherein the absence of the voice-service support indicates that the selected NTN 140 does not support voice services for the UE 100.

At operation 1910, the method 1900 may include performing, by the UE 100, at least one control action to avoid searching for voice services during the registration on the NTN 140. In an embodiment, at least one control action may be performed by the UE in one or more of: before, or during or after the registration or attach or TAU procedure.

At operation 1912, the method 1900 may include completing, by the UE 100, the registration on the NTN 140 based on the performed at least one control action.

While the above-discussed operations in FIG. 19 are shown and described in a particular sequence, the operations may occur in variations to the sequence in accordance with various embodiments. Further, a detailed description related to the various operations of FIG. 19 is already covered in the description related to FIGS. 1-18 and is omitted herein for the sake of brevity.

The disclosure provides the following advantages such as the disclosure provides system and methods for faster and stable registration for NTN services by a voice-centric UE, particularly in scenarios associated with absence of support for voice services by the NTN Network. The disclosure further provides a system and methods for better power optimization. The disclosure avoids unnecessary scanning of NTN or other RAT(s) during the process of registration for NTN services. The disclosure furthermore provides a better user experience as voice centric UE is optimized to allow faster and stable registration for NTN services. Furthermore, the disclosure ensuring power saving in the UE.

While specific language has been used to describe the disclosure, any limitations arising on account of the same are not intended. As apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method performed by a user equipment (UE) for handling a non-terrestrial network (NTN) connection, the method comprising:

detecting at least one of: a presence of the UE in an NTN only coverage area, or a non-availability of a terrestrial network (TN) coverage at a location of the UE;

determining an availability of an NTN;

selecting the NTN for a registration of the UE based on the availability of the NTN;

determining an absence of a voice-service support from the selected NTN, wherein the absence of the voice-service support indicates that the selected NTN does not support a voice service for the UE;

performing at least one control action to avoid searching for the voice service during the registration of the UE on the NTN; and completing the registration of the UE on the NTN, based on the performed at least one control action.

2. The method of claim 1, wherein the determining the availability of the NTN comprises at least one of:

identifying whether a network is deployed by a network operator using at least one NTN technology;

identifying whether the network is deployed over at least one of a band, a frequency, or a radio access technology (RAT) which is used to deploy the at least one NTN technology;

identifying whether the network is deployed over a public land mobile network (PLMN) which is used to deploy a NTN PLMN;

identifying at least one parameter associated with deploying the at least one NTN technology; or identifying at least one information associated with deploying the at least one NTN technology.

3. The method of claim 1, wherein the NTN comprises at least one of: low earth orbit (LEO), medium earth orbit (MEO), geostationary orbit (GEO), high altitude platform systems (HAPS), unmanned aerial vehicle (UAV), unmanned aircraft system (UAS), a network supported by an airborne vehicle, a network deployed using the 3rd generation partnership project (3GPP) satellite or NTN system, a NTN network deployed using at least one 3GPP technology, or a NTN network deployed using at least one NTN implementation outside the scope of 3GPP NTN system.

4. The method of claim 1, wherein the determining the absence of the voice-service support by the NTN comprises at least one of:

determining, prior to initiating a registration procedure or an attach procedure or a tracking area update (TAU) procedure for the registration of the UE on the NTN, the absence of the voice-service support by the NTN; or determining, after initiating the registration procedure or the attach procedure or the TAU procedure for the registration of the UE on the NTN, the absence of the voice-service support by the NTN.

5. The method of claim 1, wherein the determining the absence of the voice-service support by the NTN comprises determining the absence of the voice-service support based on at least one of:

an indication received by the UE during the registration procedure or the attach procedure or the TAU procedure;

an indication received by the UE during the registration procedure or the attach procedure or the TAU procedure indicating at least one of voice services and emergency voice services is not available;

an indication received by the UE during the registration procedure or the attach procedure or the TAU procedure indicating a short messaging services (SMS) only service is available;

a configuration setting for the UE;

a database comprising previous registration details of the UE; or an artificial intelligence (AI) or a machine learning (ML) based mechanism.

6. The method of claim 4, wherein the initiating the registration procedure or the attach procedure or the TAU procedure comprises:

performing a search for at least one available network;

detecting an availability of each of the at least one available NTN;

selecting one NTN from among the at least one NTN; and transmitting a registration request or an attach request or a TAU request to the selected NTN.

7. The method of claim 1, wherein the performing the at least one control action comprises at least one of:

avoiding initiation of a back-off timer for the selected NTN;

avoiding addition of the selected NTN to a back-off network list or a temporary forbidden network list or a forbidden network list in the UE;

remaining registered to the selected NTN;

avoiding performing at least one of a detach procedure or a deregistration procedure on the selected NTN;

avoiding performing at least one of a subsequent attach procedure or a subsequent registration procedure or a subsequent TAU procedure or multiple attach procedure or multiple registration procedure or multiple TAU procedure on the selected NTN;

avoiding disabling of at least one of a radio access technology (RAT) or an N1 mode or a S1 mode associated with the UE associated with the selected NTN;

avoiding searching for of at least one of an alternate network or a RAT or a public land mobile network (PLMN) associated with the selected NTN;

modifying a usage setting of the UE from the voice-centric usage setting to a data-centric usage setting and indicating the modified usage setting to the selected NTN in a signaling message;

registering for short messaging services (SMS) only services and indicating the SMS only services setting to the NTN in a signaling message;

modifying a service request based on the at least one service supported by the NTN and indicating the modified service request to the NTN in a signaling message;

modifying at least one of a service/registration request based on the at least one service supported by the NTN or a usage setting of the UE from the voice-centric usage setting to a data-centric usage setting while pre-determining that the absence of voice service support at the NTN PLMN;

modifying a UE mode associated with the UE from at least one of a packet switched (PS) mode 1 and a circuit switched (CS)/PS mode 1 to at least one of PS mode 2 and CS/PS mode 2;

performing at least one of a detach or a deregistration followed by at least one of an attach or a registration on the selected NTN with modified UE setting;

performing at least one of a registration procedure with mobility registration updating or a TAU procedure on the selected NTN with modified UE setting;

performing at least one of a detach with re-attach required or a deregistration with re-registration required followed by at least one of a re-Attach or a re-registration on an NTN PLMN associated with the NTN with modified UE setting; and modifying a SMS configuration to prefer to use SMS over internet protocol (IP) networks and indicating the modified SMS configuration to the NTN (140) in a signaling message.

8. The method of claim 1, wherein the performing the at least one control action comprises:

searching for non-3GPP services for a UE registered on the NTN;

searching for at least one non-3GPP network;

modifying a service configuration associated with the UE; and modifying an access network preference configuration associated with the UE from a non-3GPP inter-working function (N3IWF) to an evolved packet data gateway (ePDG).

9. A user equipment (UE) configured to handle a non-terrestrial network (NTN) connection, the UE comprising:
memory storing instructions;
one or more processor, operably connected to the memory, wherein the one or more processors are configured to execute the instructions to:
detect at least one of a presence of the UE in an NTN only coverage area or a non-availability of a terrestrial network (TN) coverage at the location of the UE;
determine an availability of an NTN;
select the NTN for a registration of the UE based on the availability of the NTN;
determine an absence of a voice-service support from the selected NTN, wherein the absence of the voice-service support indicates that the selected NTN does not support a voice service for the UE;
perform at least one control action to avoid searching for the voice service during the registration of the UE on the NTN; and
complete the registration on the NTN based on the performed at least one control action.

10. The UE of claim 9, wherein the one or more processors are further configured to execute the instructions to perform at least one of:
identify whether a network is deployed by the network operator using at least one NTN technology;
identify whether the network is deployed over at least one of a band, a frequency, or a radio access technology (RAT) which is used to deploy the at least one NTN technology;
identify whether the network is deployed over a public land mobile network (PLMN) which is used to deploy the NTN PLMN;
identify at least one parameter associated with deploying the at least one NTN technology; and
identify at least one information associated with deploying the at least one NTN technology.

11. The UE of claim 9, wherein the NTN comprises at least one of: low earth orbit (LEO), medium earth orbit (MEO), geostationary orbit (GEO), high altitude platform systems (HAPS), unmanned aerial vehicle (UAV), unmanned aircraft system (UAS), a network supported by an airborne vehicle, a network deployed using the 3$^{rd}$ generation partnership project (3GPP) satellite or NTN system, a NTN network deployed using at least one 3GPP technology, or a NTN network deployed using at least one NTN implementation outside the scope of 3GPP NTN system.

12. The UE of claim 9, wherein the one or more processors are further configured to execute the instructions to perform at least one of:
determine, prior to initiating a registration procedure or an attach procedure or a tracking area update (TAU) procedure for the registration of the UE on the NTN, the absence of the voice-service support by the NTN; or
determine, after initiating the registration procedure or the attach procedure or the TAU procedure for the registration of the UE on the NTN, the absence of the voice-service support by the NTN.

13. The UE of claim 9, wherein the one or more processors are further configured to execute the instructions to determine on at least one of:
an indication received by the UE during the registration procedure or the attach procedure or the TAU procedure;
an indication received by the UE during the registration procedure or the attach procedure or the TAU procedure indicating at least one of voice services and emergency voice services is not available;
an indication received by the UE during the registration procedure or the attach procedure or the TAU procedure indicating a short messaging services (SMS) only service is available;
a configuration setting for the UE;
a database comprising previous registration details of the UE;
an artificial intelligence (AI)/machine learning (ML) based mechanism.

14. The UE of claim 12, wherein the one or more processors are further configured to execute the instructions to:
perform a search for at least one available network;
detect an availability of each of the at least one available NTN;
select one NTN from among the at least one NTN; and
transmit a registration request or an attach request or a TAU request to the selected NTN.

15. The UE of claim 9, wherein the one or more processors are further configured to execute the instructions to:
avoid initiation of a back-off timer for the selected NTN;
avoid addition of the selected NTN to a back-off network list or a temporary forbidden network list or a forbidden network list in the UE;
remain registered to the selected NTN;
avoid performing at least one of a detach procedure or a deregistration procedure on an NTN PLMN associated with the NTN;
avoid performing at least one of a subsequent attach procedure or a subsequent registration procedure or a subsequent TAU procedure or multiple attach procedure or multiple registration procedure or multiple TAU procedure on the selected NTN;
avoid disabling of at least one of a radio access technology (RAT) or an N1 mode or a S1 mode associated with the UE associated with the selected NTN;
avoid searching for at least one of an alternate network or a RAT or a public land mobile network (PLMN) associated with the selected NTN;
modify a usage setting of the UE from the voice-centric usage setting to a data-centric usage setting and indicating the modified usage setting to the selected NTN in a signaling message;
register for short messaging services (SMS) only services and indicating the SMS only services setting to the NTN in a signaling message;
modify a service request based on the at least one service supported by the NTN and indicating the modified service request to the NTN in a signaling message;
modify at least one of a service/registration request based on the at least one service supported by the NTN or a usage setting of the UE from the voice-centric usage setting to a data-centric usage setting while pre-determining that the absence of voice service support at the NTN PLMN;
modify a UE mode associated with the UE from at least one of a packet switched (PS) mode 1 and a circuit switched (CS)/PS mode 1 to at least one of PS mode 2 and CS/PS mode 2;

perform at least one of a detach or a deregistration followed by at least one of an attach or a registration on the selected NTN with modified UE setting;

perform at least one of a registration procedure with mobility registration updating or a TAU procedure on the selected NTN with modified UE setting;

perform at least one of a detach with re-attach required or a deregistration with re-registration required followed by at least one of a re-attach or a re-registration on an NTN PLMN associated with the NTN with modified UE setting; and modify a SMS configuration to prefer to use SMS over internet protocol (IP) networks and indicating the modified SMS configuration to the NTN in a signaling message.

16. The UE of claim 9, wherein the one or more processors are further configured to execute the instructions to:

search for at least one non-3GPP network;

modify a service configuration associated with the UE; and modify an access network preference configuration associated with the UE from a non-3GPP inter-working function (N3IWF) to an evolved packet data gateway (ePDG).

17. One or more non-transitory computer readable storage media storing computer-executable instructions that, when executed by at least one processor of a user equipment (UE), causes the UE to perform operations, the operations comprising:

detecting at least one of: a presence of the UE in an non-terrestrial network (NTN) only coverage area, or a non-availability of a terrestrial network (TN) coverage at a location of the UE;

determining an availability of an NTN;

selecting the NTN for a registration of the UE based on the availability of the NTN;

determining an absence of a voice-service support from the selected NTN, wherein the absence of the voice-service support indicates that the selected NTN does not support a voice service for the UE;

performing at least one control action to avoid searching for the voice service during the registration of the UE on the NTN; and completing the registration of the UE on the NTN, based on the performed at least one control action.

* * * * *